(12) United States Patent
Tanaka et al.

(10) Patent No.: US 12,393,378 B2
(45) Date of Patent: Aug. 19, 2025

(54) IMAGE PROCESSING METHOD AND IMAGE PROCESSING APPARATUS

(71) Applicant: KYOCERA Document Solutions Inc., Osaka (JP)

(72) Inventors: Kazunori Tanaka, Osaka (JP); Takuya Miyamoto, Osaka (JP); Koji Sato, Osaka (JP); Rui Hamabe, Osaka (JP); Kanako Morimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 262 days.

(21) Appl. No.: 18/031,578

(22) PCT Filed: Dec. 22, 2021

(86) PCT No.: PCT/JP2021/047456
§ 371 (c)(1),
(2) Date: Apr. 12, 2023

(87) PCT Pub. No.: WO2022/138684
PCT Pub. Date: Jun. 30, 2022

(65) Prior Publication Data
US 2023/0384989 A1     Nov. 30, 2023

(30) Foreign Application Priority Data

Dec. 24, 2020    (JP) ................. 2020-214837

(51) Int. Cl.
*G06F 3/12*     (2006.01)
*G06T 7/00*     (2017.01)
(Continued)

(52) U.S. Cl.
CPC ............ *G06F 3/121* (2013.01); *G06F 3/1208* (2013.01); *G06F 3/1234* (2013.01);
(Continued)

(58) Field of Classification Search
None
See application file for complete search history.

(56) References Cited

U.S. PATENT DOCUMENTS 10,402,641 B1 * 9/2019 Dang .................... G06F 16/353
2016/0320615 A1 * 11/2016 Nakamura ......... G02B 27/0961
(Continued)

FOREIGN PATENT DOCUMENTS

JP     2008227983 A    9/2008
JP     2017083544 A    5/2017

*Primary Examiner* — Darryl V Dottin
(74) *Attorney, Agent, or Firm* — Alleman Hall & Tuttle LLP

(57) ABSTRACT

An object of the present invention is to determine the cause of an image defect that occurs in an image forming device with high accuracy while suppressing the amount of calculation at a processor. A processor (80) determines the cause of an image defect on the basis of a test image read from an output sheet of an image forming device (2). The processor (80) generates a plurality of feature images by executing a feature extraction process on the test image. Further, the processor (80) uses each of the plurality of feature images as an input image and determines which of a plurality of cause candidates corresponding to the image defect the input image corresponds to by pattern recognition of the input image.

9 Claims, 11 Drawing Sheets

(51) Int. Cl.
*G06T 7/90* (2017.01)
*G06V 10/20* (2022.01)
*G06V 10/44* (2022.01)
*G06V 10/764* (2022.01)
*G06V 10/77* (2022.01)
*G06V 20/50* (2022.01)

(52) U.S. Cl.
CPC .............. *G06T 7/0004* (2013.01); *G06T 7/90* (2017.01); *G06V 10/20* (2022.01); *G06V 10/44* (2022.01); *G06V 10/764* (2022.01); *G06V 10/7715* (2022.01); *G06V 20/50* (2022.01); *G06T 2207/10024* (2013.01); *G06T 2207/30144* (2013.01)

(56) References Cited

U.S. PATENT DOCUMENTS

2019/0281171 A1* 9/2019 Hayashi ............. H04N 1/00045
2020/0311900 A1* 10/2020 Hurley ................. G06F 18/214

\* cited by examiner

IMAGE PROCESSING METHOD AND IMAGE PROCESSING APPARATUS

FIELD

The present invention relates to an image processing method and an image processing apparatus for determining a cause of an image defect based on a test image.

BACKGROUND

An image forming apparatus such as a printer or a multifunction peripheral executes a print process of forming an image on a sheet. In the print process, an image defect such as a horizontal streak, a noise point, or density unevenness may occur in an image formed on an output sheet.

For example, when the image forming apparatus is an apparatus that executes the print process by an electrophotographic method, various portions such as a photoconductor, a charging portion, a developing portion, and a transferring portion can be considered as the cause of the image defect. Skill is required to determine the cause of the image defect.

It is also known that, in an image processing apparatus, a phenomenon causing a vertical streak, which is an example of the image defect, and feature information such as the color, density, or number of screen lines of the vertical streak are associated in advance as table data, and the phenomenon causing the vertical streak is identified based on information on the color, density, or number of screen lines of an image of the vertical streak in a test image and the table data (see, for example, Patent Literature 1).

The table data is data in which the ranges of parameters such as the color, density, or number of screen lines of the image is set by threshold values for each type of phenomenon that causes the vertical streak.

CITATION LIST

Patent Literature

Patent Literature 1: Japanese Unexamined Patent Application Publication No. 2017-83544

SUMMARY OF THE INVENTION

Problem to be Solved by the Invention

When the cause of the image defect is determined by comparing the value of a specific image parameter, such as the color, density, or number of screen lines of an image, with a predetermined threshold value, omission of determination or erroneous determination is likely to occur.

On the other hand, an image pattern recognition process is suitable for classifying an input image into many events with high accuracy. For example, the pattern recognition process is a process of using a trained model trained using sample images corresponding to a plurality of event candidates as training data to determine which of the event candidates the input image corresponds to.

However, the amount of information of an image is large, and there are a plurality of types of image defects, such as a horizontal streak, a vertical streak, a noise point, and density unevenness. Furthermore, there are many possible cause candidates for each type of the image defect.

Accordingly, when a test image including the image defect is used as an input image for the pattern recognition process, the amount of calculation for the pattern recognition process becomes very large. Thus, it is difficult to execute the pattern recognition process with a processor provided in a multifunction peripheral or the like.

In addition, in order to increase the accuracy of determining the cause of the image defect, an enormous amount of the training data is required for training the trained model. However, it takes a great deal of time and effort to prepare an enormous number of test images corresponding to combinations of possible types of the image defects and possible causes of the image defects for each model of image forming device.

An object of the present invention is to provide an image processing method and an image processing apparatus capable of determining the cause of an image defect that occurs in an image forming device with high accuracy while suppressing the amount of calculation at a processor.

Solution to Problem

An image processing method according to one aspect of the present invention is a method in which a processor determines a cause of an image defect based on a test image read from an output sheet of an image forming device. The image processing method includes generating, by the processor, a plurality of feature images by executing a predetermined feature extraction process on the test image. Furthermore, the image processing method includes executing, by the processor, a feature pattern recognition process of using each of the plurality of feature images as an input image and determining which of a plurality of predetermined cause candidates corresponding to the image defect the input image corresponds to by pattern recognition of the input image.

An image processing apparatus according to another aspect of the present invention includes a processor for executing the processes of the image processing method.

Advantageous Effects of Invention

According to the present invention, it is possible to provide an image processing method and an image processing apparatus capable of determining the cause of an image defect that occurs in an image forming device with high accuracy while suppressing the amount of calculation at a processor.

DETAILED DESCRIPTION

An embodiment of the present invention will be described below with reference to the drawings. It is noted that the following embodiment is an example of embodying the present invention and does not limit the technical scope of the present invention.

[Configuration of Image Processing Apparatus 10]

An image processing apparatus 10 according to the embodiment includes an image forming device 2 that executes a print process. The print process is a process of forming an image on a sheet. The sheet is an image forming medium such as paper or a sheet-like resin member.

The image processing apparatus 10 further includes an image reading device 1 that executes a reading process of reading an image from a document sheet. For example, the image processing apparatus 10 is a copier, a facsimile machine, a multifunction peripheral, or the like.

The image to be subjected to the print process is an image read from the document sheet by the image reading device 1 or an image represented by print data received from a host device (not shown). The host device is an information processing apparatus such as a personal computer or a portable information terminal.

Figure 6:
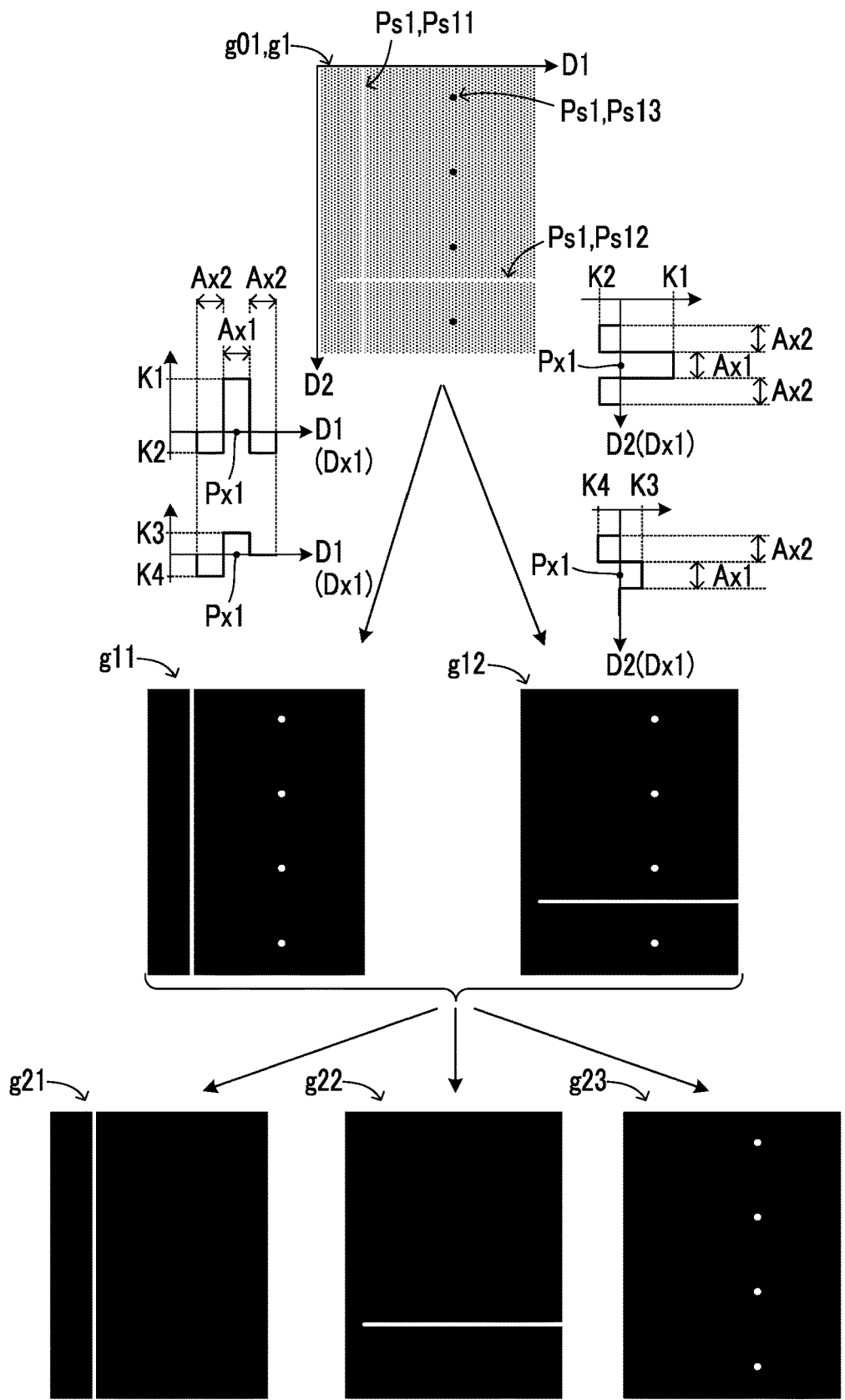
FIG. 6 is a diagram showing an example of a test image including a singular part and examples of a preprocessed image and a feature image generated based on the test image.

Further, the image forming device 2 may form a predetermined original test image g01 on the sheet by the print process (see FIG. 6). The original test image g01 is the original image of a test image g1 used for determining the presence/absence and the cause of an image defect in the image forming device 2 (see FIG. 6). The test image g1 will be described later.

A process including the reading process by the image reading device 1 and the print process by the image forming device 2 based on an image obtained in the reading process is a copy process.

Figure 1:
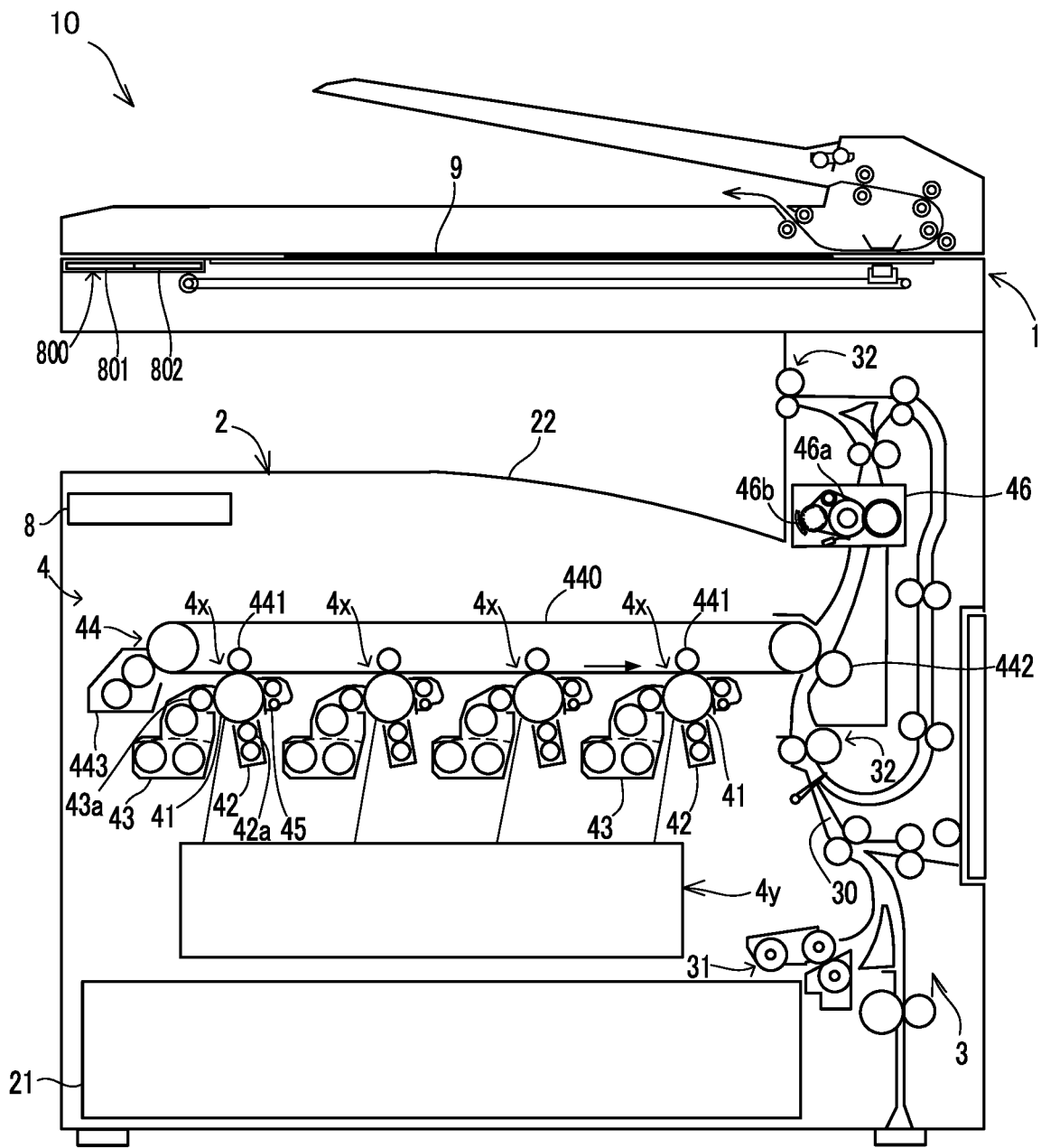
FIG. 1 is a configuration diagram of an image processing apparatus according to an embodiment.

As shown in FIG. 1, the image forming device 2 includes a sheet conveying mechanism 3 and a printing portion 4. The sheet conveying mechanism 3 includes a sheet feeding mechanism 31 and a plurality of sheet conveying roller pairs 32.

The sheet feeding mechanism 31 feeds the sheet from a sheet storing portion 21 to a sheet conveying path 30. The plurality of sheet conveying roller pairs 32 convey the sheet along the sheet conveying path 30, and discharge the sheet on which an image has been formed to a discharge tray 22.

The printing portion 4 executes the print process on the sheet conveyed by the sheet conveying mechanism 3. In the present embodiment, the printing portion 4 executes the print process using an electrophotographic method.

The printing portion 4 includes an image forming portion 4x, a laser scanning unit 4y, a transfer device 44, and a fixing device 46. The image forming portion 4x includes a drum-shaped photoconductor 41, a charging device 42, a developing device 43, and a drum cleaning device 45.

In each image forming portion 4x, the photoconductor 41 rotates, and the charging device 42 uniformly charges the surface of the photoconductor 41. The charging device 42 includes a charging roller 42a that rotates in contact with the surface of the photoconductor 41. The laser scanning unit 4y writes an electrostatic latent image on the charged surface of the photoconductor 41 by scanning with a laser beam.

The developing device 43 develops the electrostatic latent image into a toner image. The developing device 43 includes a developing roller 43a that supplies toner to the photoconductor 41. The transfer device 44 transfers the toner image on the surface of the photoconductor 41 to the sheet. It is noted that the toner is an example of a granular developer.

The fixing device 46 heats the toner image on the sheet to fix the toner image on the sheet. The fixing device 46 includes a fixing rotary body 46a that rotates in contact with the sheet, and a fixing heater 46b that heats the fixing rotary body 46a.

The image forming device 2 shown in FIG. 1 is a tandem-type color printing device capable of executing the print process of a color image. Therefore, the printing portion 4 includes four image forming portions 4x respectively corresponding to toners of different colors.

In addition, in the tandem-type image forming device 2, the transfer device 44 includes four primary transfer rollers 441 corresponding to four photoconductors 41, an intermediate transfer belt 440, a secondary transfer roller 442, and a belt cleaning device 443.

The four image forming portions 4x respectively form the toner images of cyan, magenta, yellow, and black on the surfaces of the photoconductors 41. Each primary transfer roller 441 is also a part of the corresponding image forming portion 4x.

In each image forming portion 4x, the primary transfer roller 441 urges the intermediate transfer belt 440 to the surface of the photoconductor 41 while rotating. The primary transfer roller 441 transfers the toner image from the photoconductor 41 to the intermediate transfer belt 440. Thus, a color image composed of the toner images of four colors is formed on the intermediate transfer belt 440.

In each image forming portion 4x, the drum cleaning device 45 removes and collects, from the photoconductor 41, toner remaining on the photoconductor 41 without being transferred to the intermediate transfer belt 440.

The secondary transfer roller 442 transfers the toner image in four colors on the intermediate transfer belt 440 to the sheet. It is noted that, in the image processing apparatus 10, each of the photoconductor 41 and the intermediate transfer belt 440 of the transfer device 44 is an example of an image carrier that rotates while carrying the toner image.

The belt cleaning device 443 removes and collects, from the intermediate transfer belt 440, toner remaining on the intermediate transfer belt 440 without being transferred to the sheet.

As shown in FIG. 1, the image processing apparatus 10 includes a data processing portion 8 and a human interface device 800 in addition to the image forming device 2 and the image reading device 1. The human interface device 800 includes an operation portion 801 and a display portion 802.

The data processing portion 8 executes various types of data processing relating to the print process or the reading process, and also controls various electrical devices.

The operation portion 801 is a device for receiving a user's operation. For example, the operation portion 801 includes one or both of a push button and a touch panel. The display portion 802 includes a display panel that displays information provided to the user.

Figure 2:
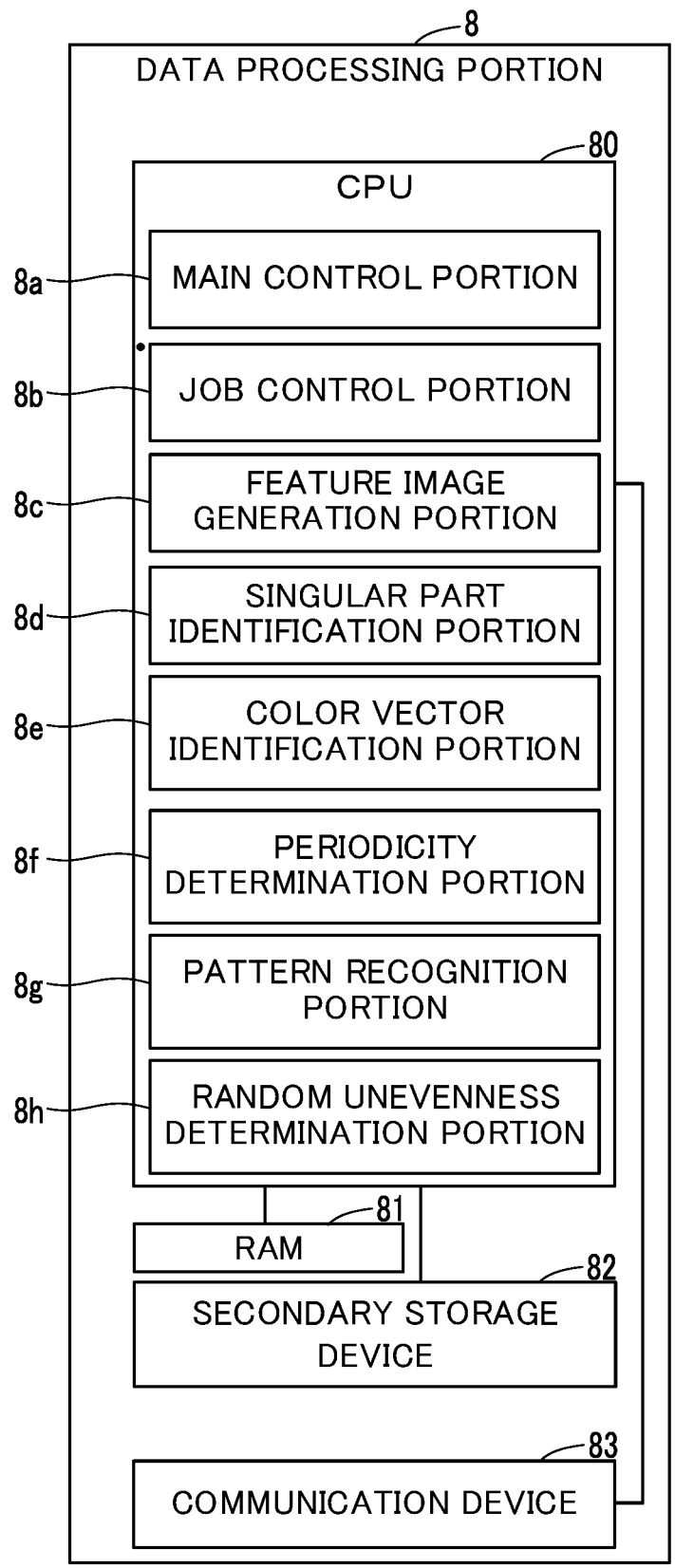
FIG. 2 is a block diagram showing a configuration of a data processing portion in the image processing apparatus according to the embodiment.

As shown in FIG. 2, the data processing portion 8 includes a central processing unit (CPU) 80, a random access memory (RAM) 81, a secondary storage device 82, and a communication device 83.

The CPU 80 can execute processing of data received by the communication device 83, various types of image processing, and control of the image forming device 2. The received data may include the print data. The CPU 80 is an example of a processor that executes data processing including the image processing. It is noted that the CPU may be implemented by other types of processors such as a digital signal processor (DSP).

The communication device 83 is a communication interface device that performs communication with other devices such as the host device through a network such as a local area network (LAN). The CPU 80 performs all of transmission and reception of data to and from the other devices through the communication device 83.

The secondary storage device 82 is a computer-readable nonvolatile storage device. The secondary storage device 82 stores computer programs executed by the CPU 80 and various types of data referred to by the CPU 80. For example, one or both of a flash memory and a hard disk drive are employed as the secondary storage device 82.

The RAM 81 is a computer-readable volatile storage device. The RAM 81 temporarily stores the computer programs to be executed by the CPU 80 and data output and referred to in the process of the CPU 80 executing the programs.

The CPU 80 includes a plurality of processing modules implemented by executing the computer programs. The plurality of processing modules include a main control portion 8a, a job control portion 8b, and the like. It is noted that some or all of the plurality of processing modules may be implemented by a processor separate and independent from the CPU 80, such as a DSP.

The main control portion 8a executes a process of selecting a job corresponding to an operation to the operation portion 801, a process of causing the display portion 802 to display information, a process of setting various types of data, and the like. Furthermore, the main control portion 8a executes a process of determining the contents of the data received by the communication device 83.

The job control portion 8b controls the image reading device 1 and the image forming device 2. For example, when the data received by the communication device 83 includes the print data, the job control portion 8b causes the image forming device 2 to execute the print process based on the received data.

In addition, when the main control portion 8a detects a copy request operation to the operation portion 801, the job control portion 8b causes the image reading device 1 to execute the reading process and causes the image forming device 2 to execute the print process based on an image obtained in the reading process.

Figure 8:
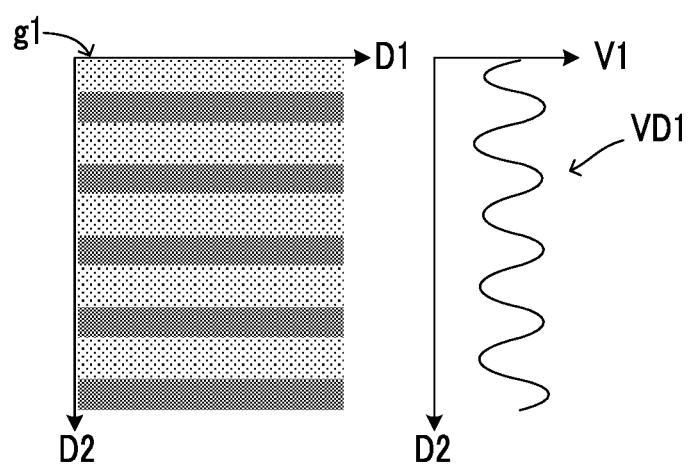
FIG. 8 is a diagram showing an example of a test image including periodic density unevenness and vertical waveform data derived based on the test image.

In the print process, an image defect such as a vertical streak Ps11, a horizontal streak Ps12, a noise point Ps13, or density unevenness may occur in an image formed on an output sheet (see FIG. 6 and FIG. 8).

As mentioned above, the image forming device 2 executes the print process using an electrophotographic method. In this case, various portions such as the photoconductor 41, the charging device 42, the developing device 43, and the transfer device 44 are considered to be the cause of the image defect. Skill is required to determine the cause of the image defect.

In the present embodiment, the image forming device 2 executes a test print process of forming a predetermined original test image g01 on the sheet.

For example, when the main control portion 8a detects a test output operation to the operation portion 801, the job control portion 8b causes the image forming device 2 to execute the test print process. In the following description, the sheet on which the original test image g01 has been formed will be referred to as a test output sheet 9 (see FIG. 1).

Further, the main control portion 8a causes the display portion 802 to display a predetermined guidance message when the test print process is executed. This guidance message is a message for urging the user to perform a reading start operation to the operation portion 801 after setting the test output sheet 9 in the image reading device 1.

When the main control portion 8a detects a reading start operation to the operation portion 801 after the guidance message is displayed on the display portion 802, the job control portion 8b causes the image reading device 1 to execute the reading process. Thus, the original test image g01 is read by the image reading device 1 from the test output sheet 9 output by the image forming device 2, and a read image corresponding to the original test image g01 is obtained.

Then, as will be described later, the CPU 80 executes a process of determining the presence/absence and the cause of the image defect, based on the read image or a test image g1 which is a compressed image of the read image (see FIG. 6). The CPU 80 is an example of a processor that executes the processes of an image processing method for determining the presence/absence and the cause of the image defect.

It is noted that the device that reads the original test image g01 from the test output sheet 9 may be, for example, a digital camera. It is noted that the process of reading the original test image g01 from the test output sheet 9 with the image reading device 1 or the digital camera is an example of an image reading process on the test output sheet 9.

When the cause of the image defect is determined by comparing the value of a specific image parameter, such as the color, density, or number of screen lines of the image, with a predetermined threshold value, omission of determination or erroneous determination is likely to occur.

On the other hand, an image pattern recognition process is suitable for classifying an input image into many events with high accuracy. For example, the pattern recognition process is a process of using a trained model trained using sample images corresponding to a plurality of event candidates as training data to determine which of the plurality of event candidates the input image corresponds to, or the like.

However, the amount of information of an image is large, and there are a plurality of types of the image defects such as the vertical streak Ps11, the horizontal streak Ps12, the noise point Ps13, and the density unevenness (see FIG. 6 and FIG. 8). Furthermore, there are many possible cause candidates for each type of the image defect.

Accordingly, when a test image g1 including the image defect is used as an input image for the pattern recognition process, the amount of calculation for the pattern recognition process becomes very large. Thus, it is difficult to execute the pattern recognition process with a processor provided in a multifunction peripheral or the like.

In addition, in order to increase the accuracy of determining the cause of the image defect, an enormous amount of the training data is required for training the trained model. However, it takes a great deal of time and effort to prepare an enormous number of test images g1 corresponding to combinations of possible types of the image defects and possible causes of the image defects for each model of image forming device 2.

Figure 3:
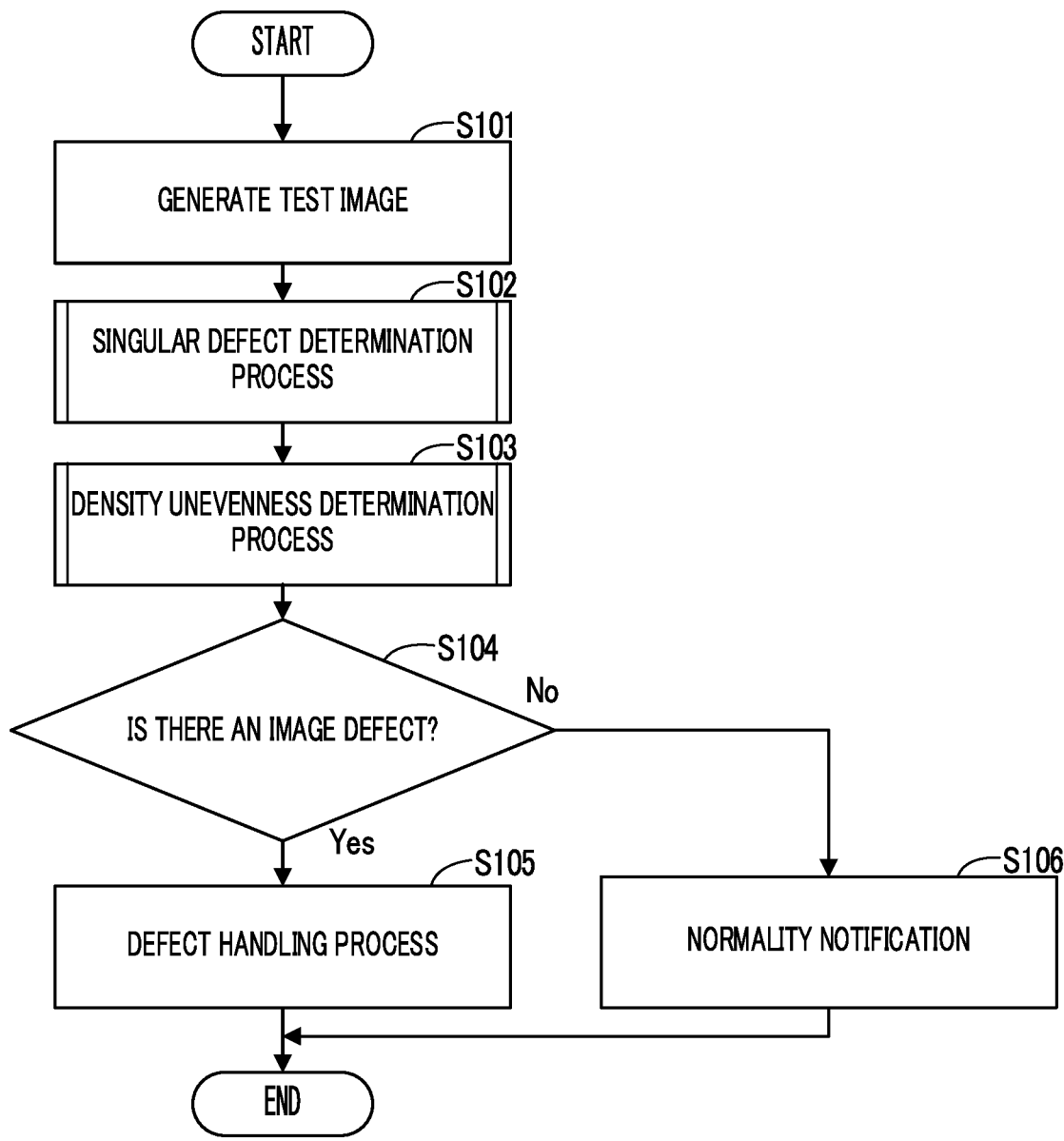
FIG. 3 is a flowchart showing an example of the procedure of an image defect determination process in the image processing apparatus according to the embodiment.

In the image processing apparatus 10, the CPU 80 executes an image defect determination process to be described later (see FIG. 3). This allows the CPU 80 to determine the cause of the image defect that occurs in the image forming device 2 with high accuracy while suppressing the amount of calculation.

In the following description, an image such as the test image g1 to be processed by the CPU 80 is digital image data. The digital image data forms map data including a plurality of pixel values corresponding to two-dimensional coordinate areas arranged in a main scanning direction D1 and a sub-scanning direction D2 intersecting the main scanning direction D1 for each of the three primary colors. The three primary colors are, for example, red, green, and blue. It is noted that the sub-scanning direction D2 is orthogonal to the main scanning direction D1. It is noted that the main scanning direction D1 is the horizontal direction in the test image g1, and the sub-scanning direction D2 is the vertical direction in the test image g1.

For example, each of the original test image g01 and the test image g1 is a mixed-color halftone image obtained by combining a plurality of uniform single-color halftone images corresponding to a plurality of developing colors in the image forming device 2. Each of the plurality of single-color halftone images is an image formed uniformly at a predetermined halftone reference density.

In the present embodiment, each of the original test image g01 and the test image g1 is a mixed-color halftone image obtained by combining four uniform single-color halftone images corresponding to all the developing colors in the image forming device 2. In the test print process, one test output sheet 9 including one original test image g01 is output. Accordingly, one test image g1 corresponding to the original test image g01 is the subject for identification of the image defect.

In addition, the plurality of processing modules in the CPU 80 further include a feature image generation portion 8c, a singular part identification portion 8d, a color vector identification portion 8e, a periodicity determination portion 8f, a pattern recognition portion 8g, and a random unevenness determination portion 8h in order to execute the image defect determination process (see FIG. 2).

[Image Defect Determination Processing]

An example of the procedure of the image defect determination process will be described below with reference to the flowchart shown in FIG. 3. In the following description, S101, S102, . . . represent identification codes of a plurality of steps in the image defect determination process.

The main control portion 8a causes the feature image generation portion 8c to execute the process of step S101 in the image defect determination process when the reading process is executed in response to the reading start operation to the operation portion 801 after the guidance message is displayed on the display portion 802.

<Step S101>

In step S101, the feature image generation portion 8c generates a test image g1 from the read image obtained in the image reading process on the test output sheet 9.

For example, the feature image generation portion 8c extracts, as the test image g1, a portion of the original image obtained by excluding the outer margin area and the text portion from the read image.

Alternatively, the feature image generation portion 8c generates the test image g1 by a compression process of compressing a portion of the original image obtained by excluding the outer margin area from the read image to a predetermined reference resolution. The feature image generation portion 8c compresses the read image when the resolution of the read image is higher than the reference resolution. After generating the test image g1, the main control portion 8a shifts the process to step S102.

<Step S102>

In step S102, the feature image generation portion 8c starts a singular defect determination process to be described later. The singular defect determination process is a process of determining the presence/absence of a singular part Ps1 such as the vertical streak Ps11, the horizontal streak Ps12, or the noise point Ps13 in the test image g1 and the cause of the occurrence of the singular part Ps1 (see FIG. 6). The singular part Ps1 is an example of the image defect.

When the singular defect determination process is completed, the main control portion 8a shifts the process to step S103.

<Step S103>

In step S103, the periodicity determination portion 8f starts a density unevenness determination process to be described later. When the density unevenness determination process is completed, the main control portion 8a shifts the process to step S104.

<Step S104>

In step S104, the main control portion 8a shifts the process to step S105 when it is determined that the image defect has occurred by the process of step S102 or step S103, and shifts the process to step S106 otherwise.

<Step S105>

In step S105, the main control portion 8a executes a defect handling process associated in advance with the type and cause of the image defect determined to have occurred by the process of step S102 or step S103.

For example, the defect handling process includes one or both of a first handling process and a second handling process to be described below. The first handling process is a process of causing the display portion 802 to display a handling message for urging replacement or cleaning of a component that is the cause of the image defect.

The handling message is predetermined for each determination result of the feature pattern recognition process. The handling message is an example of a message corresponding to the determination result in the feature pattern recognition process.

The second handling process is a process of correcting an image forming parameter in order to eliminate or mitigate the image defect. The image forming parameter is a parameter relating to the control of the image forming portion 4x.

In the first handling process, the main control portion 8a may transmit the handling message to a predetermined terminal through the communication device 83. Thus, the handling message is displayed on a display portion of the terminal. The terminal is used by, for example, a service person or a specific user.

After executing the defect handling process, the main control portion 8a terminates the image defect determination process.

<Step S106>

On the other hand, in step S106, the main control portion 8a terminates the image defect determination process after executing a normality notification indicating that no image defect was identified.

[Singular Defect Determination Process]

Next, an example of the procedure of the singular defect determination process in step S102 will be described with reference to the flowchart shown in FIG. 4. In the following description, S201, S202, . . . represent identification codes of a plurality of steps in the singular defect determination process. The singular defect determination process starts from step S201.

<Step S201>

First, in step S201, the feature image generation portion 8c generates a plurality of feature images g21, g22, and g23 by executing a predetermined feature extraction process on the test image g1. Each of the feature images g21, g22, and g23 is an image into which a predetermined specific type of singular part Ps1 in the test image g1 has been extracted.

In the present embodiment, the plurality of feature images g21, g22, and g23 include a first feature image g21, a second feature image g22, and a third feature image g23 (see FIG. 6).

The first feature image g21 is an image into which the vertical streak Ps11 in the test image g1 has been extracted. The second feature image g22 is an image into which the horizontal streak Ps12 in the test image g1 has been extracted. The third feature image g23 is an image into which the noise point Ps13 in the test image g1 has been extracted.

Figure 7:
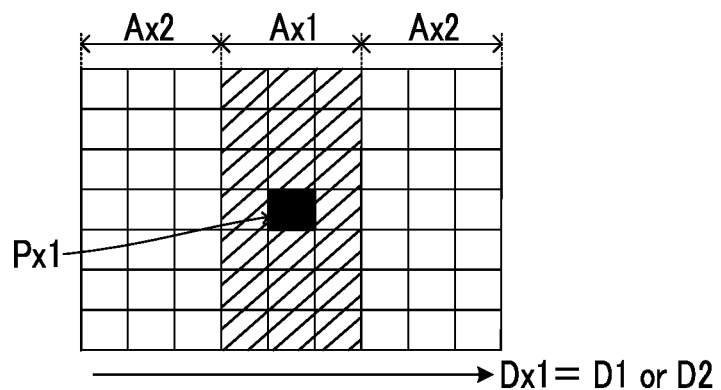
FIG. 7 is a diagram showing examples of an area of interest, which is sequentially selected from the test image in a main filter process by the image processing apparatus according to the embodiment, and adjacent areas.

In the present embodiment, the feature extraction process includes first preprocessing, second preprocessing, and a singular part extraction process. In the following description, pixels sequentially selected from the test image g1 will each be referred to as a pixel of interest Px1 (see FIG. 6 and FIG. 7).

The feature image generation portion 8c generates a first preprocessed image g11 by executing the first preprocessing on the test image g1 with the main scanning direction D1 used as a processing direction Dx1 (see FIG. 6).

Further, the feature image generation portion 8c generates a second preprocessed image g12 by executing the second preprocessing on the test image g1 with the sub-scanning direction D2 used as the processing direction Dx1 (see FIG. 6).

Furthermore, the feature image generation portion 8c generates three feature images g21, g22, and g23 by executing the singular part extraction process on the first preprocessed image g11 and the second preprocessed image g12.

The first preprocessing includes a main filter process with the main scanning direction D1 used as the processing direction Dx1. The main filter process is a process of converting the pixel value of each pixel of interest Px1 sequentially selected from the test image g1 into a converted value obtained by a process of emphasizing the difference between the pixel values of an area of interest Ax1 and the pixel values of two adjacent areas Ax2 (see FIG. 6 and FIG. 7).

The area of interest Ax1 is an area including the pixel of interest Px1, and the two adjacent areas Ax2 are preset areas adjacent to the area of interest Ax1 on both sides in the processing direction Dx1. The area of interest Ax1 and the adjacent areas Ax2 are areas each including one or more pixels.

The sizes of the area of interest Ax1 and the adjacent areas Ax2 are set in accordance with the width of the vertical streak Ps11 or the horizontal streak Ps12 to be extracted or the size of the noise point Ps13 to be extracted.

The area of interest Ax1 and the adjacent areas Ax2 each occupy the same range in a direction intersecting the processing direction Dx1. In the example shown in FIG. 7, the area of interest Ax1 is a 21-pixel area spanning three columns and seven rows centered on the pixel of interest Px1. Each of the adjacent areas Ax2 is also a 21-pixel area spanning three columns and seven rows. It is noted that, in each of the area of interest Ax1 and the adjacent areas Ax2, the number of rows is the number of lines along the processing direction Dx1, and the number of columns is the number of lines along the direction intersecting the processing direction Dx1. The sizes of the area of interest Ax1 and the adjacent areas Ax2 are preset.

In the main filter process, each pixel value of the area of interest Ax1 is converted into a first corrected value using a predetermined first correction coefficient K1, and each pixel value of the adjacent areas Ax2 is converted into a second corrected value using a predetermined second correction coefficient K2.

For example, the first correction coefficient K1 is a coefficient of 1 or greater by which each pixel value of the area of interest Ax1 is multiplied, and the second correction coefficient K2 is a coefficient of less than 0 by which each pixel value of the adjacent areas Ax2 is multiplied. In this case, the first correction coefficient K1 and the second correction coefficient K2 are set so that the sum of a value obtained by multiplying the first correction coefficient K1 by the number of pixels of the area of interest Ax1 and a value obtained by multiplying the second correction coefficient K2 by the number of pixels of the two adjacent areas Ax2 is zero.

The feature image generation portion 8c derives the first corrected value corresponding to each pixel of the area of interest Ax1 by multiplying each pixel value of the area of interest Ax1 by the first correction coefficient K1, and derives the second corrected value corresponding to each pixel of the two adjacent areas Ax2 by multiplying each pixel value of the two adjacent areas Ax2 by the second correction coefficient K2. Then, the feature image generation portion 8c derives a value obtained by integrating the first corrected values and the second corrected values as the converted value of the pixel value of the pixel of interest Px1.

For example, the feature image generation portion 8c derives the converted value by adding the sum or average value of the first corrected values corresponding to a plurality of pixels of the area of interest Ax1 and the sum or average value of the second corrected values corresponding to a plurality of pixels of the two adjacent areas Ax2.

The absolute value of the converted value is an amplified absolute value of the difference between the pixel values of the area of interest Ax1 and the pixel values of the two adjacent areas Ax2. The process of deriving the converted value obtained by integrating the first corrected values and the second corrected values is an example of a process of emphasizing the difference between the pixel values of the area of interest Ax1 and the pixel values of the two adjacent areas Ax2.

It is noted that the case where the first correction coefficient K1 is a negative number and the second correction coefficient K2 is a positive number is also conceivable.

For example, the feature image generation portion 8c may generate, as the first preprocessed image g11, first main map data including a plurality of integrated values obtained by the main filter process with the main scanning direction D1 used as the processing direction Dx1.

As shown in FIG. 6, when the test image g1 includes one or both of the vertical streak Ps11 and the noise point Ps13, the first main map data into which one or both of the vertical streak Ps11 and the noise point Ps13 included in the test image g1 have been extracted is generated by the main filter process with the main scanning direction D1 used as the processing direction Dx1.

In addition, when the test image g1 includes the horizontal streak Ps12, the first main map data obtained by excluding the horizontal streak Ps12 included in the test image g1 is generated by the main filter process with the main scanning direction D1 used as the processing direction Dx1.

It is noted that the vertical streak Ps11 corresponds to a first singular part, the horizontal streak Ps12 corresponds to a second singular part, and the noise point Ps13 corresponds to a third singular part.

On the other hand, the second preprocessing includes the main filter process with the sub-scanning direction D2 used as the processing direction Dx1.

For example, the feature image generation portion 8c may generate, as the second preprocessed image g12, second main map data including a plurality of integrated values obtained by the main filter process with the sub-scanning direction D2 used as the processing direction Dx1.

As shown in FIG. 6, when the test image g1 includes one or both of the horizontal streak Ps12 and the noise point Ps13, the second main map data into which one or both of the horizontal streak Ps12 and the noise point Ps13 included in the test image g1 have been extracted is generated by the main filter process with the sub-scanning direction D2 used as the processing direction Dx1.

In addition, when the test image g1 includes the vertical streak Ps11, the second main map data not including the vertical streak Ps11 included in the test image g1 is generated by the main filter process with the sub-scanning direction D2 used as the processing direction Dx1.

However, in the main filter process, an erroneous integrated value which is opposite in sign to the integrated value representing the actual state of the singular part Ps1 may be derived in edge portions at both ends of the singular part Ps1 in the processing direction Dx1. Processing such an erroneous integrated value as a pixel value representing the singular part Ps1 may adversely affect the determination of the image defect.

Therefore, in the present embodiment, the first preprocessing further includes an edge enhancement filter process with the main scanning direction D1 used as the processing direction Dx1 in addition to the main filter process with the main scanning direction D1 used as the processing direction Dx1.

Similarly, the second preprocessing further includes the edge enhancement filter process with the sub-scanning direction D2 used as the processing direction Dx1 in addition to the main filter process with the sub-scanning direction D2 used as the processing direction Dx1.

The edge enhancement filter process is a process of performing edge enhancement on the area of interest Ax1 and a predetermined one of the two adjacent areas Ax2.

Specifically, the edge enhancement filter process is a process of converting the pixel value of each pixel of interest Px1 sequentially selected from the test image g1 into an edge intensity obtained by integrating a third corrected value obtained by correcting each pixel value of the area of interest Ax1 by a positive or negative third correction coefficient K3 and a fourth corrected value obtained by correcting each pixel value of one of the adjacent areas Ax2 by a fourth correction coefficient K4 opposite in sign to the third correction coefficient K3 (see FIG. 6).

In the example shown in FIG. 6, the third correction coefficient K3 is a positive coefficient, and the fourth correction coefficient K4 is a negative coefficient. The third correction coefficient K3 and the fourth correction coefficient K4 are set so that the sum of a value obtained by multiplying the third correction coefficient K3 by the number of pixels of the area of interest Ax1 and a value obtained by multiplying the fourth correction coefficient K4 by the number of pixels of one of the adjacent areas Ax2 is zero.

When the edge enhancement filter process is executed with the main scanning direction D1 used as the processing direction Dx1, horizontal edge intensity map data in which each pixel value of the test image g1 has been converted into the edge intensity is generated.

Similarly, when the edge enhancement filter process is executed with the sub-scanning direction D2 used as the processing direction Dx1, vertical edge intensity map data in which each pixel value of the test image g1 has been converted into the edge intensity is generated.

In the present embodiment, the feature image generation portion 8c generates the first main map data generated by the main filter process with the main scanning direction D1 used as the processing direction Dx1.

Further, the feature image generation portion 8c generates the horizontal edge intensity map data by executing the edge enhancement filter process with the main scanning direction D1 used as the processing direction Dx1.

Further, the feature image generation portion 8c generates the first preprocessed image g11 by correcting each pixel value of the first main map data with the corresponding pixel value of the horizontal edge intensity map data. For example, the feature image generation portion 8c generates the first preprocessed image g11 by adding the absolute value of the corresponding pixel value of the horizontal edge intensity map data to each pixel value of the first main map data.

Similarly, the feature image generation portion 8c generates the second main map data by executing the main filter process with the sub-scanning direction D2 used as the processing direction Dx1.

Further, the feature image generation portion 8c generates the vertical edge intensity map data by executing the edge enhancement filter process with the sub-scanning direction D2 used as the processing direction Dx1.

Further, the feature image generation portion 8c generates the second preprocessed image g12 by correcting each pixel value of the second main map data with the corresponding pixel value of the vertical edge intensity map data. For example, the feature image generation portion 8c generates the second preprocessed image g12 by adding the absolute value of the corresponding pixel value of the vertical edge intensity map data to each pixel value of the second main map data.

The singular part extraction process is a process of generating three feature images g21, g22, and g23 into which the vertical streak Ps11, the horizontal streak Ps12, and the noise point Ps13 included in the first preprocessed image g11 or the second preprocessed image g12 have been separately extracted respectively. The three feature images g21, g22, and g23 are a first feature image g21, a second feature image g22, and a third feature image g23.

The first feature image g21 is an image into which a singular part Ps1 that is present in the first preprocessed image g11 and is not common to the first preprocessed image g11 and the second preprocessed image g12, among the singular parts Ps1 consisting of one or more significant pixels in the first preprocessed image g11 and the second preprocessed image g12, has been extracted. The first feature image g21 does not include the horizontal streak Ps12 or the noise point Ps13, and includes the vertical streak Ps11 when the first preprocessed image g11 includes the vertical streak Ps11.

It is noted that the significant pixel is a pixel that can be distinguished from other pixels by comparing each pixel value in the test image g1 or an index value based on each pixel value with a predetermined threshold value.

The second feature image g22 is an image into which a singular part Ps1 that is present in the second preprocessed image g12 and is not common to the first preprocessed image g11 and the second preprocessed image g12, among the singular parts Ps1 in the first preprocessed image g11 and the second preprocessed image g12, has been extracted. The second feature image g22 does not include the vertical streak Ps11 or the noise point Ps13, and includes the horizontal streak Ps12 when the second preprocessed image g12 includes the horizontal streak Ps12.

The third feature image g23 is an image into which a singular part Ps1 common to the first preprocessed image g11 and the second preprocessed image g12 has been extracted. The third feature image g23 does not include the vertical streak Ps11 or the horizontal streak Ps12, and includes the noise point Ps13 when the first preprocessed image g11 and the second preprocessed image g12 include the noise point Ps13.

Various methods are conceivable for generating the three feature images g21, g22, and g23 from the first preprocessed image g11 and the second preprocessed image g12.

For example, the feature image generation portion 8c derives an index value Zi by applying a first pixel value Xi, which is each pixel value exceeding a predetermined reference value in the first preprocessed image g11, and a second pixel value Yi, which is each pixel value exceeding the reference value in the second preprocessed image g12, to the following equation (1). Here, the subscript i is the identification number of the position of each pixel.

[Equation 1]

$$Zi=(|Xi|-|Yi|)/(|Xi|+|Yi|) \quad (1)$$

The index value Zi of each pixel constituting the vertical streak Ps11 is a relatively large positive number. In addition, the index value Zi of each pixel constituting the horizontal streak Ps12 is a relatively small negative number. In addition, the index value Zi of each pixel constituting the noise point Ps13 is 0 or a value close to 0. The index value Zi is an example of an index value of the difference between corresponding pixel values in the first preprocessed image g11 and the second preprocessed image g12.

The above-described properties of the index value Zi can be utilized to simplify the process of extracting the vertical streak Ps11 from the first preprocessed image g11, extracting the horizontal streak Ps12 from the second preprocessed image g12, and extracting the noise point Ps13 from the first preprocessed image g11 or the second preprocessed image g12.

For example, the feature image generation portion 8c generates the first feature image g21 by converting the first pixel value Xi in the first preprocessed image g11 into a first singularity degree Pi derived by the following equation (2). Thus, the first feature image g21 into which the vertical streak Ps11 has been extracted from the first preprocessed image g11 is generated.

[Equation 2]

$$Pi=Xi \cdot Zi \quad (2)$$

Further, the feature image generation portion 8c generates the second feature image g22 by converting the second pixel value Yi in the second preprocessed image g12 into a second singularity degree Qi derived by the following equation (3). Thus, the second feature image g22 into which the horizontal streak Ps12 has been extracted from the second preprocessed image g12 is generated.

[Equation 3]

$$Qi=Yi \cdot (-Zi) \quad (3)$$

Further, the feature image generation portion 8c generates the third feature image g23 by converting the first pixel value Xi in the first preprocessed image g11 into a third singularity degree Ri derived by the following equation (4). Thus, the third feature image g23 into which the noise point Ps13 has been extracted from the first preprocessed image g11 is generated.

[Equation 4]

$$Ri=Xi \cdot (1-Zi) \quad (4)$$

Alternatively, the feature image generation portion 8c may generate the third feature image g23 by converting the second pixel value Yi in the second preprocessed image g12 into a third singularity degree Ri derived by the following equation (5). Thus, the third feature image g23 into which the noise point Ps13 has been extracted from the second preprocessed image g12 is generated.

[Equation 5]

$$Ri=Yi \cdot (Zi-1) \quad (5)$$

As described above, the feature image generation portion 8c generates the first feature image g21 by the process of converting each pixel value of the first preprocessed image g11 using the predetermined equation (2) based on the index value Zi. Equation (2) is an example of a first conversion equation.

Further, the feature image generation portion 8c generates the second feature image g22 by the process of converting each pixel value of the second preprocessed image g12 using the predetermined equation (3) based on the index value Zi. Equation (3) is an example of a second conversion equation.

Further, the feature image generation portion 8c generates the third feature image g23 by the process of converting each pixel value of the first preprocessed image g11 or the second preprocessed image g12 using the predetermined equation (4) or (5) based on the index value Zi. Each of equations (4) and (5) is an example of a third conversion equation.

The process of generating the first feature image g21, the second feature image g22, and the third feature image g23 in step S201 is an example of a process of extracting each of the vertical streak Ps11, the horizontal streak Ps12, and the noise point Ps13 among one or more singular parts Ps1 in the first preprocessed image g11 and the second preprocessed image g12 as the image defect.

After generating the feature images g21, g22, and g23, the feature image generation portion 8c shifts the process to step S202.

<Step S202>

In step S202, the singular part identification portion 8d identifies the position of the singular part Ps1 in each of the feature images g21, g22, and g23.

For example, the singular part identification portion 8d determines that a portion having a pixel value outside a predetermined reference range in each of the feature images g21, g22, and g23 is the singular part Ps1.

When a plurality of singular parts Ps1 are present within a predetermined proximity range in each of the main scanning direction D1 and the sub-scanning direction D2, the singular part identification portion 8d executes a combination process of combining the plurality of singular parts Ps1 as one singular part Ps1 including a series of singular parts Ps1 for each of the feature images g21, g22, and g23.

For example, when the first feature image g21 includes two vertical streaks Ps11 spaced apart in the sub-scanning direction D2 within the proximity range, the singular part identification portion 8d combines the two vertical streaks Ps11 as one vertical streak Ps11 by the combination process.

Similarly, when the second feature image g22 includes two horizontal streaks Ps12 spaced apart in the main scanning direction D1 within the proximity range, the singular part identification portion 8d combines the two horizontal streaks Ps12 as one horizontal streak Ps12 by the combination process.

In addition, when the third feature image g23 includes a plurality of noise points Ps13 aligned at intervals in the main scanning direction D1 or the sub-scanning direction D2 within the proximity range, the singular part identification portion 8d combines the plurality of noise points Ps13 as one noise point Ps13 by the combination process.

When the position of the singular part Ps1 is not identified in any of the three feature images g21, g22, and g23, the singular part identification portion 8d terminates the singular defect determination process. On the other hand, when the position of the singular part Ps1 is identified in one or more of the three feature images g21, g22 and g23, the singular part identification portion 8d shifts the process to step S203.

<Step S203>

In step S203, the color vector identification portion 8e identifies a color vector representing a vector in a color space from one to the other of the color of the singular part Ps1 in the test image g1 and the color of a reference area including the periphery of the singular part Ps1.

The reference area is a predetermined range of area determined based on the singular part Ps1. For example, the reference area is an area including a peripheral area adjacent to the singular part Ps1 and excluding the singular part Ps1. Alternatively, the reference area may include the singular part Ps1 and a peripheral area adjacent to the singular part Ps1.

The test image g1 is originally a uniform halftone image. Therefore, when a good test image g1 is formed on the test output sheet 9, the singular part Ps1 is not identified, and the color vector at any position of the test image g1 is substantially a zero vector.

On the other hand, when the singular part Ps1 is identified, the direction of the color vector between the singular part Ps1 and the reference area corresponding to the singular part Ps1 indicates an excess or deficiency of the toner density of one of the four developing colors in the image forming device 2.

Accordingly, the direction of the color vector indicates which of the four image forming portions 4x in the image forming device 2 is the cause of the occurrence of the singular part Ps1.

It is noted that the color vector identification portion 8e may identify a vector in the color space from one to the other of the color of the singular part Ps1 in the test image g1 and a predetermined reference color as the color vector. In this case, the reference color is the original color of the test image g1.

Further, in step S203, the color vector identification portion 8e determines, based on the color vector, a developing color that is the cause of the singular part Ps1 and the excess/deficiency state of the density of the developing color.

For example, the secondary storage device 82 stores in advance information of a plurality of unit vectors representing the directions in which the densities of cyan, magenta, yellow, and black increase and directions in which the same densities become deficient with respect to the reference color of the test image g1.

The color vector identification portion 8e normalizes the color vector to a predetermined unit length. Further, the color vector identification portion 8e determines which of the plurality of unit vectors corresponding to the increases or deficiencies of the densities of cyan, magenta, yellow, and black the normalized color vector most closely approximates, thereby determining a developing color causing the singular part Ps1 and the excess/deficiency state of the density of the developing color.

After executing the process of step S203, the color vector identification portion 8e shifts the process to step S204.

<Step S204>

In step S204, the periodicity determination portion 8f shifts the process to step S205 when the singular part Ps1 is identified in one or both of the second feature image g22 and the third feature image g23, and shifts the process to step S206 otherwise.

In the following description, one or both of the second feature image g22 and the third feature image g23 in which the singular part Ps1 is identified will each be referred to as a periodicity determination subject image. The singular part Ps1 in the periodicity determination subject image is the horizontal streak Ps12 or the noise point Ps13 (see FIG. 6).

<Step S205>

In step S205, the periodicity determination portion 8f executes a periodic singular part determination process on the periodicity determination subject image. The periodic singular part determination process includes a number determination process, a singular part periodicity determination process, and a singular part periodicity cause determination process.

The number determination process is a process of determining the number of singular parts Ps1 aligned in the sub-scanning direction D2 in the periodicity determination subject image.

Specifically, the periodicity determination portion 8f determines the number of horizontal streaks Ps12 aligned in the sub-scanning direction D2 by counting the number of horizontal streaks Ps12 aligned in the sub-scanning direction D2 whose portions occupying the same range in the main scanning direction D1 exceed a predetermined ratio in the second feature image g22.

Further, the periodicity determination portion 8f determines the number of noise points Ps13 aligned in the sub-scanning direction D2 by counting the number of noise points Ps13 aligned in the sub-scanning direction D2 whose positional deviations in the main scanning direction D1 are within a predetermined range in the third feature image g23.

The periodicity determination portion 8f executes the singular part periodicity determination process only when there are two or more singular parts Ps1 aligned in the sub-scanning direction D2.

In addition, the periodicity determination portion 8f determines that the singular part Ps1 has no periodicity when there is one singular part Ps1 aligned in the sub-scanning direction D2, and skips the singular part periodicity determination process and the singular part periodicity cause determination process.

The singular part periodicity determination process is a process of determining the presence/absence of one or more predetermined periodicities in the sub-scanning direction D2 for the periodicity determination subject image.

The periodicity corresponds to the outer circumferential length of each of the image forming portions 4x, or of the image-forming related rotary body such as the photoconductor 41, the charging roller 42a, the developing roller 43a, or the primary transfer roller 441 in the transfer device 44. The state of the image-forming related rotary body influences the quality of the image formed on the sheet. In the following description, the image-forming related rotary body will be referred to as an image-forming rotary body.

When the image defect is caused by the defect of the image-forming rotary body, the periodicity corresponding to the outer circumferential length of the image-forming rotary body may appear as the intervals of a plurality of horizontal streaks Ps12 or a plurality of noise points Ps13 in the sub-scanning direction D2.

Accordingly, when the periodicity determination subject image has the periodicity corresponding to the outer circumferential length of the image-forming rotary body, it can be said that the image-forming rotary body corresponding to the periodicity is the cause of the horizontal streaks Ps12 or the noise points Ps13 in the periodicity determination subject image.

When the number of singular parts Ps1 aligned in the sub-scanning direction D2 in the periodicity determination subject image is two, the periodicity determination portion 8f executes an interval derivation process as the singular part periodicity determination process.

In the interval derivation process, the periodicity determination portion 8f derives the interval of the two singular parts Ps1 in the sub-scanning direction D2 as the periodicity of the two singular parts Ps1.

When the number of singular parts Ps1 aligned in the sub-scanning direction D2 in the periodicity determination subject image is three or more, the periodicity determination portion 8f executes a frequency analysis process as the singular part periodicity determination process.

In the frequency analysis process, the periodicity determination portion 8f performs frequency analysis, such as Fourier transform, on the periodicity determination subject image including three or more singular parts Ps1 aligned in the sub-scanning direction D2, thereby identifying a singular part frequency which is a dominant frequency in the frequency distribution of the data strings of the singular parts Ps1 in the periodicity determination subject image.

Further, the periodicity determination portion 8f derives a period corresponding to the singular part frequency as the period of the three or more singular parts Ps1.

In the singular part periodicity cause determination process, the periodicity determination portion 8f determines whether or not the outer circumferential length of each of a plurality of predetermined candidate image-forming rotary bodies satisfies a predetermined period approximation condition between the outer circumferential length of the candidate image-forming rotary body and the period of the singular parts Ps1. The plurality of candidate image-forming rotary bodies in step S205 are examples of a plurality of predetermined cause candidates corresponding to the horizontal streaks Ps12 or the noise points Ps13.

In the following description, among the singular parts Ps1 included in the second feature image g22 and the third feature image g23, the singular parts Ps1 for which one of the candidate image-forming rotary bodies is determined to satisfy the period approximation condition will be referred to as periodic singular parts, and the other singular parts Ps1 are referred to as non-periodic singular parts.

In the singular part cause determination process, the periodicity determination portion 8f determines that one of the candidate image-forming rotary bodies determined to satisfy the period approximation condition is the cause of the occurrence of the periodic singular parts. Thus, the cause of the horizontal streaks Ps12 or the noise points Ps13 is determined.

In addition, in step S205, the periodicity determination portion 8f determines, based on the color vector determined in step S203, which image-forming rotary body of the four image forming portions 4x of different developing colors is the cause of the horizontal streaks Ps12 or the noise points Ps13.

In addition, when three or more singular parts Ps1 aligned in the sub-scanning direction D2 include the non-periodic singular part that does not correspond to the singular part frequency, the periodicity determination portion 8f subjects the non-periodic singular part to a feature pattern recognition process to be described later.

For example, the periodicity determination portion 8f generates inverse Fourier transform data by performing inverse Fourier transform on a frequency distribution obtained by removing the frequency components other than the singular part frequency from the frequency distribution obtained by the Fourier transform.

Further, the periodicity determination portion 8f determines, among the three or more singular parts Ps1 aligned in the sub-scanning direction D2, one that is located off the peak position of the waveform in the sub-scanning direction D2 indicated by the inverse Fourier transform data, as the non-periodic singular part.

When it is determined as a result of the process of step S205 that the second feature image g22 and the third feature image g23 do not include the non-periodic singular part, the periodicity determination portion 8f terminates the singular defect determination process.

On the other hand, when it is determined as a result of the process of step S205 that the second feature image g22 and the third feature image g23 include the non-periodic singular part, the periodicity determination portion 8f shifts the process to step S206.

<Step S206>

In step S206, the pattern recognition portion 8g executes a feature pattern recognition process on each of the first feature image g21, and the second feature image g22 and third feature image g23 each including the non-periodic singular part. The second feature image g22 including the non-periodic singular part or the third feature image g23 including the non-periodic singular part is an example of a non-periodic feature image.

In the feature pattern recognition process, each of the first feature image g21, and the second feature image g22 and third feature image g23 each including the non-periodic singular part is used as an input image. In the feature pattern recognition process, the pattern recognition portion 8g determines which of a plurality of predetermined cause candidates corresponding to the image defects the input image corresponds to by pattern recognition of the input image.

In addition, the input image of the feature pattern recognition process may include the horizontal edge intensity map data or the vertical edge intensity map data obtained by the edge enhancement filter process. For example, in the feature pattern recognition process for determining the vertical streak Ps11, the first feature image g21 and the horizontal edge intensity map data are used as the input image.

Similarly, in the feature pattern recognition process for determining the horizontal streak Ps12, the second feature image g22 and the vertical edge intensity map data are used as the input image.

Similarly, in the feature pattern recognition process for determining the noise point Ps13, the third feature image g23 and one or both of the horizontal edge intensity map data and the vertical edge intensity map data are used as the input image.

For example, the feature pattern recognition process is a process of classifying the input image into one of the plurality of cause candidates using a trained model trained in advance using a plurality of sample images corresponding to the plurality of cause candidates as training data.

For example, the trained model may be a model employing a classification-type machine learning algorithm called a random forest, a model employing a machine learning algorithm called a support vector machine (SVM), or a model employing a convolutional neural network (CNN).

The trained model is prepared separately for each of the first feature image g21 and the second feature image g22 and third feature image g23 each including the non-periodic singular part. In addition, the plurality of sample images are used as the training data for each of the cause candidates.

In addition, in step S206, the pattern recognition portion 8g determines, based on the color vector determined in step S203, which of the four image forming portions 4x of different developing colors is the cause of the vertical streak Ps11, the horizontal streak Ps12, or the noise point Ps13.

By the process of step S206, the cause of the vertical streak Ps11 and the cause of the horizontal streak Ps12 and the noise point Ps13 determined as the non-periodic singular part are determined. After executing the process of step S206, the pattern recognition portion 8g terminates the singular defect determination process.

[Density Unevenness Determination Process]

Next, an example of the procedure of the density unevenness determination process in step S103 will be described with reference to the flowchart shown in FIG. 5, In the following description, S301, S302, . . . represent identification codes of a plurality of steps in the density unevenness determination process. The density unevenness determination process starts from step S301.

<Step S301>

In step S301, the periodicity determination portion 8f derives a vertical data string VD1 for each predetermined specific color of the test image g1. The specific colors are colors corresponding to the developing colors of the image forming device 2. The vertical data string VD1 is a data string of representative values V1 of a plurality of pixel values for the respective lines in the main scanning direction D1 in each of the images of the specific colors constituting the test image g1 (see FIG. 7).

For example, the specific colors are three colors of the four developing colors of the image forming device 2. In this case, the periodicity determination portion 8f converts red, green, and blue image data constituting the test image g1 into cyan, yellow, and magenta image data.

Then, the periodicity determination portion 8f derives a representative value V1 of a plurality of pixel values for each line in the main scanning direction D1 for each of the image data of the three specific colors corresponding to the test image g1, thereby deriving three vertical data strings VD1 corresponding to cyan, yellow, and magenta.

It is noted that the specific colors may be three primary colors of red, green, and blue. In this case, the periodicity determination portion 8f converts each pixel value of each of the three image data of red, green, and blue in the test image g1 into a value representing a ratio to an average value or a total value of the pixel values of the three image data of red, green, and blue in the test image g1. Furthermore, the periodicity determination portion 8f derives three vertical data strings VD1 for the three image data after conversion.

Here, red is a color corresponding to cyan, green is a color corresponding to magenta, and blue is a color corresponding to yellow. That is, the density unevenness of cyan appears as the density unevenness in the red image data after conversion, the density unevenness of magenta appears as the density unevenness in the green image data after conversion, and the density unevenness of yellow appears as the density unevenness in the blue image data after conversion.

For example, the representative value V1 is an average value, a maximum value, a minimum value, or the like of the remaining pixel values obtained by excluding the pixel values of the singular part Ps1 from all the pixel values of the line extending in the main scanning direction D1. Alternatively, the representative value V1 may be an average value, a maximum value, a minimum value, or the like of all the pixel values of the line extending in the main scanning direction D1.

After executing the process of step S301, the periodicity determination portion 8f shifts the process to step S302.

<Step S302>

In step S302, the periodicity determination portion 8f executes a periodic unevenness determination process on the vertical data string VD1 of each specific color.

For example, the periodicity determination portion 8f performs frequency analysis, such as Fourier transformation, on each vertical data string VD1, thereby identifying a density unevenness frequency which is a dominant frequency in the frequency distribution of the vertical data string VD1.

Further, the periodicity determination portion 8f derives a period corresponding to the density unevenness frequency as a period of the density unevenness in the test image g1.

Further, the periodicity determination portion 8f determines, for each of the predetermined candidate image-forming rotary bodies, whether or not the outer circumferential length of the candidate image-forming rotary body satisfies the period approximation condition between the outer peripheral length of the candidate image-forming rotary body and the period of the density unevenness. The fact that it is determined that one of the plurality of candidate image-forming rotary bodies satisfies the period approximation condition means that it is determined that periodic density unevenness has occurred in the test image g1.

The plurality of candidate image-forming rotary bodies in step S302 are examples of a plurality of predetermined cause candidates corresponding to the periodic density unevenness in the test image g1. The periodic density unevenness is an example of the image defect.

Further, the periodicity determination portion 8f determines the cause of the periodic density unevenness based on the developing color corresponding to the vertical data string VD1 and the candidate image-forming rotary body determined to satisfy the period approximation condition.

However, when the periodic density unevenness is caused by the image forming portion 4x of black, a pixel value variation occurs in all of the red, green, and blue image data constituting the test image g1.

Therefore, when the periodicity determination portion 8f determines that the periodic density unevenness having the same periodicity has occurred in all of cyan, magenta, and yellow, the periodicity determination portion 8f determines that the image forming portion 4x of black is the cause of the periodic density unevenness.

The periodicity determination portion 8f terminates the density unevenness determination process when it is determined that the periodic density unevenness has occurred in the test image g1, and shifts the process to step S303 otherwise.

<Step S303>

In step S303, the random unevenness determination portion 8h determines the presence/absence of the occurrence of random density unevenness for each of the image data of the three specific colors corresponding to the test image g1. The random density unevenness is a type of the image defect.

The random unevenness determination portion 8h determines the presence/absence of the occurrence of the random density unevenness by determining whether or not a pixel value variation of each of the image data of the three specific colors exceeds a predetermined allowable range.

For example, the degree of the pixel value variation is determined based on a variance, a standard deviation, a difference between a median value and a maximum value or a minimum value, or the like in each of the image data of the three specific colors.

However, when it is determined that the random density unevenness has occurred in all of cyan, magenta, and yellow, the random unevenness determination portion 8h determines that the image forming portion 4x of black is the cause of the random density unevenness.

The random unevenness determination portion 8h shifts the process to step S304 when it is determined that the random density unevenness is caused in the test image g1, and terminates the density unevenness determination process otherwise.

<Step S304>

In step S304, the pattern recognition portion 8g executes a random pattern recognition process. The random pattern recognition process is a process of using the test image g1 determined to have the random density unevenness as an input image and determining which of one or more cause candidates the input image corresponds to by pattern recognition of the input image.

After executing the process of step S304, the pattern recognition portion 8g terminates the density unevenness determination process.

The CPU 80 executing the image defect determination process including the singular defect determination process and the density unevenness determination process is an example of an image processing method for determining the cause of the image defect based on the test image g1 read from the output sheet of the image forming device 2.

As described above, the feature image generation portion 8c generates the first preprocessed image g11 by executing the first preprocessing including the main filter process with the horizontal direction of the test image g1 used as the processing direction Dx1. The main filter process is a process of converting the pixel value of each pixel of interest Px1 sequentially selected from the test image g1 into a converted value obtained by a process of emphasizing the difference between the pixel values of the area of interest Ax1 and the pixel values of two predetermined adjacent areas Ax2 adjacent to the area of interest Ax1 on both sides in the processing direction Dx1 (see step S201 in FIG. 4, and FIG. 6).

Figure 4:
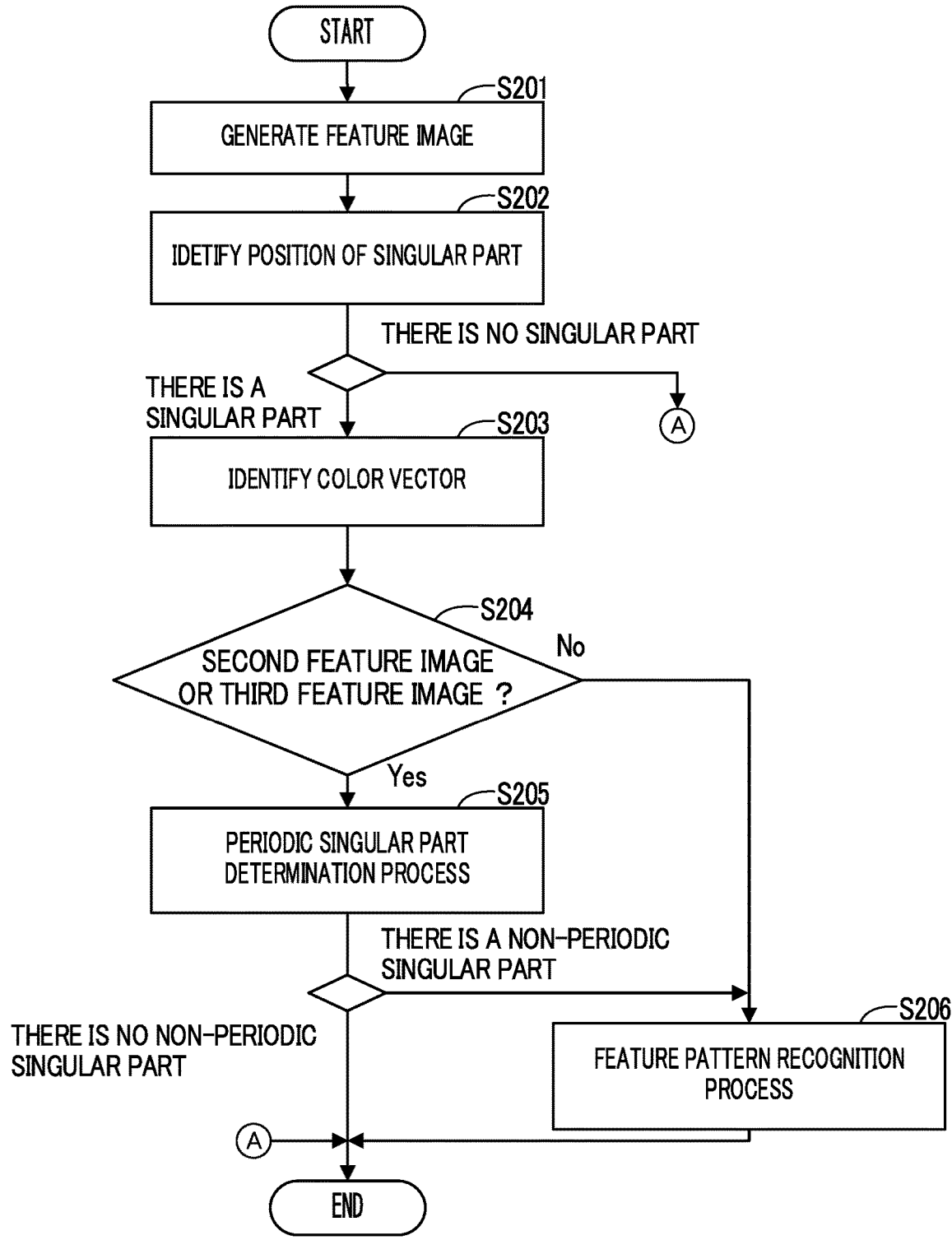
FIG. 4 is a flowchart showing an example of the procedure of a singular defect determination process in the image processing apparatus according to the embodiment.

Further, the feature image generation portion 8c generates the second preprocessed image g12 by executing the second preprocessing including the main filter process with the vertical direction of the test image g1 used as the processing direction Dx1 (see step S201 in FIG. 4, and FIG. 6).

Further, the feature image generation portion 8c extracts each of the vertical streak Ps11, the horizontal streak Ps12, and the noise point Ps13 among one or more singular parts Ps1 in the first preprocessed image g11 and the second preprocessed image g12 as the image defects (see step S201 in FIG. 4, and FIG. 6).

The feature extraction process of step S201 is a simple process with a small calculation load. By such a simple process, three feature images g21, g22, and g23 into which singular parts Ps1 having different shapes have been extracted from one test image g1 can be generated.

Then, the periodicity determination portion 8f and the pattern recognition portion 8g execute the periodic singular part determination process and the feature pattern recognition process using the first feature image g21, the second feature image g22, and the third feature image g23, thereby determining the causes of the vertical streak Ps11, the horizontal streak Ps12, and the noise point Ps13, which are types of the image defects, respectively (see step S205 and step S206 in FIG. 4, and FIG. 6).

Since the determination of the cause of the image defect is separately performed for the three feature images g21, g22, and g23 including the singular parts Ps1 of different types, the cause of the image defect can be determined with high accuracy by a relatively simple determination process.

The periodic singular part determination process in step S205 is a process of determining the presence/absence of one or more predetermined periodicities in the sub-scanning direction D2 for the second feature image g22 or the third feature image g23, and determining the cause of the horizontal streaks Ps12 or the noise points Ps13 in accordance with the periodicity determination result.

When the horizontal streaks Ps12 or the noise points Ps13 are caused by a defect in the image-forming related rotary body, the cause of the horizontal streaks Ps12 or the noise points Ps13 can be determined with high accuracy by the periodic singular part determination process of determining the periodicity corresponding to the outer circumferential length of the rotary body.

The feature pattern recognition process in step S206 is a process of determining which of a plurality of predetermined cause candidates corresponding to the vertical streak, the horizontal streak, and the noise point the input image corresponds to by pattern recognition of the input image. Here, the first feature image g21 and the image determined to have no periodicity by the periodic singular part determination process among the second feature image g22 and the third feature image g23 are the input images in step S206 (see steps S204 to S206 in FIG. 4).

The periodic singular part determination process in step S205 and the feature pattern recognition process in step S206 are an example of a predetermined cause determination process using the first feature image g21, the second feature image g22, and the third feature image g23.

The feature pattern recognition process using a trained model or the like is performed for each of the feature images g21, g22, and g23 into which specific types of singular parts Ps1 have been extracted respectively. This allows determination of the cause of the image defect with high accuracy while suppressing the amount of calculation at the CPU 80. Further, the trained model for each type of the singular part Ps1 can be sufficiently trained only by preparing a relatively small amount of training data corresponding to the specific type of the singular part Ps1.

The feature pattern recognition process in step S206 is executed on the first feature image g21 which was not subjected to the periodic singular part determination process in step S205, and the second feature image g22 or the third feature image g23 determined to have no periodicity by the periodic singular part determination process in step S205, among the feature images g21, g22, and g23 (see steps S204 to S206 in FIG. 4).

In the above case, the feature pattern recognition process can exclude the possibility that the cause of the image defect is a cause corresponding to the periodicity of an image-forming related rotary body. This simplifies the feature pattern recognition process.

In addition, the color vector identification portion 8e identifies the color vector representing a vector in the color space from one to the other of the color of the singular part Ps1 in the test image g1 and the color of the reference area including the periphery of the singular part Ps1 (see step S203 in FIG. 4).

Then, in the cause determination process, the periodicity determination portion 8f in step S205 and the pattern recognition portion 8g in step S206 further use the color vector to determine the causes of the vertical streaks Ps11, the horizontal streaks Ps12, and the noise points Ps13. That is, the periodicity determination portion 8f and the pattern recognition portion 8g use the color vector to determine which of the plurality of developing colors in the image forming device 2 corresponds to the cause of the image defect.

In the image forming device 2 capable of printing a color image, the use of the color vector makes it possible to easily and reliably determine the portion corresponding which color of the plurality of developing colors the image defect is caused by.

Figure 5:
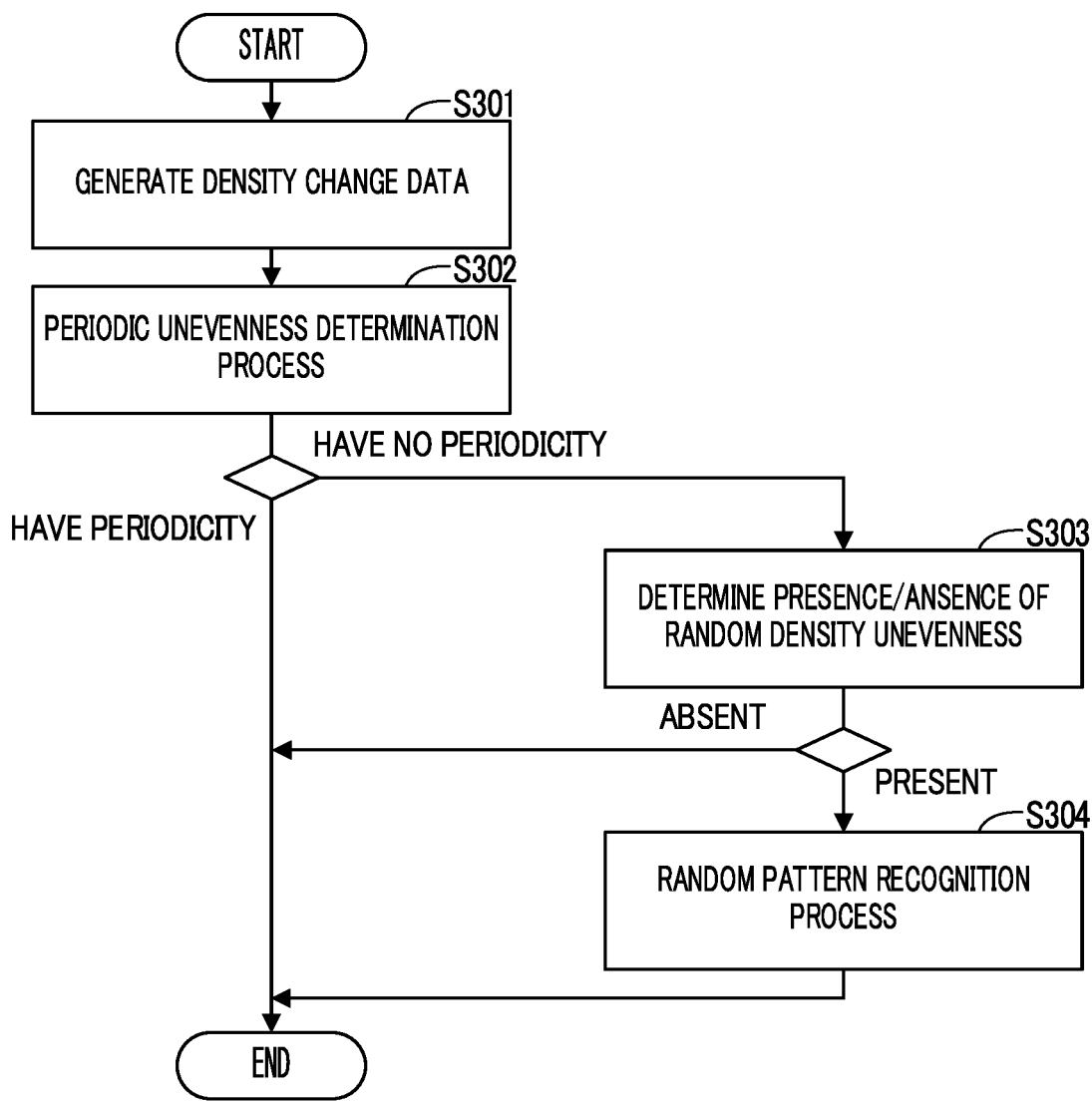
FIG. 5 is a flowchart showing an example of the procedure of a density unevenness determination process in the image processing apparatus according to the embodiment.

In addition, the periodicity determination portion 8f executes the periodic unevenness determination process for each of the predetermined specific colors for the test image g1 (see steps S301 and S302 in FIG. 5). The periodic unevenness determination process is a process of determining the presence/absence of one or more predetermined periodicities in the sub-scanning direction D2, and further determining the presence/absence of the occurrence of the periodic density unevenness, which is a type of the image defect, and the cause thereof in accordance with the periodicity determination result.

The cause of the periodic density unevenness can be determined with high accuracy by the periodic unevenness determination process.

In addition, the random unevenness determination portion 8h determines the presence/absence of the occurrence of the random density unevenness by determining whether or not the pixel value variation for each specific color exceeds a predetermined allowable range for the test image g1 determined to have no periodicity by the periodic unevenness determination process of step S302 (see step S303 in FIG. 5). The random density unevenness is a type of the image defect.

In addition, the pattern recognition portion 8g executes the random pattern recognition process using the test image g1 determined to have the random density unevenness as the input image (see step S304 in FIG. 5). In the random pattern recognition process, it is determined which of the one or more cause candidates the input image corresponds to by pattern recognition of the input image.

The test image g1 is a mixed-color halftone image obtained by combining a plurality of uniform single-color halftone images corresponding to a plurality of developing colors in the image forming device 2. This allows the CPU 80 to determine the cause of the image defect for all the developing colors in the image forming device 2, using the test images g1 smaller in number than the developing colors used by the image forming device 2.

First Application Example

Next, the procedure of the feature image generation process in a first application example of the image processing apparatus 10 will be described with reference to the flowchart shown in FIG. 9.

In the following description, S401, S402, . . . represent identification codes of a plurality of steps in the feature image generation process according to the present application example. The feature image generating process according to the present application example starts from step S401.
<Step S401>

In step S401, the feature image generation portion 8c selects a compression ratio to be adopted from a plurality of preset compression ratio candidates, and shifts the process to step S402.
<Step S402>

In step S402, the feature image generation portion 8c generates a test image g1 by compressing the read image at the selected compression ratio. The processes of steps S401 and S402 are an example of a compression process. Thereafter, the feature image generation portion 8c shifts the process to step S403.
<Step S403>

In step S403, the feature image generation portion 8c generates a first preprocessed image g11 by executing the first preprocessing on the compressed test image g1 obtained in step S402. Thereafter, the feature image generation portion 8c shifts the process to step S404.
<Step S404>

In step S404, the feature image generation portion 8c generates a second preprocessed image g12 by executing the second preprocessing on the compressed test image g1 obtained in step S402. Thereafter, the feature image generation portion 8c shifts the process to step S405.
<Step S405>

In step S405, the feature image generation portion 8c shifts the process to step S406 when the processes of steps S401 to S404 have been executed for all of the plurality of compression ratio candidates, and otherwise executes the processes of steps S401 to S404 for a different compression ratio.

The feature image generation portion 8c generates a plurality of test images g1 having different sizes by compressing the read image at a plurality of compression ratios in the compression process of steps S401 and S402.

Further, in steps S403 and S404, the feature image generation portion 8c executes the first preprocessing and the second preprocessing on the plurality of test images g1 to generate a plurality of first preprocessed images g11 and a plurality of second preprocessed images g12 corresponding to the plurality of test images g1.

<Step S406>

In step S406, the feature image generation portion 8c executes the singular part extraction process on each of the plurality of first preprocessed images g11 and the plurality of second preprocessed images g12. Thus, the feature image generation portion 8c generates a plurality of candidates for each of the first feature image g21, the second feature image g22, and the third feature image g23 corresponding to the plurality of test images g1. Thereafter, the feature image generation portion 8c shifts the process to step S407.

<Step S407>

In step S407, the feature image generation portion 8c generates the first feature image g21, the second feature image g22, and the third feature image g23 by aggregating the plurality of candidates obtained in step S406. Thereafter, the feature image generation portion 8c terminates the feature image generation process.

For example, the feature image generation portion 8c sets a representative value such as a maximum value or an average value of respective pixel values in a plurality of candidates of the first feature image g21 as the corresponding pixel value of the first feature image g21. The same applies to the second feature image g22 and the third feature image g23.

The processes of steps S401 to S404 are an example of a process of generating a plurality of first preprocessed images g11 and a plurality of second preprocessed images g12 by executing the first preprocessing and the second preprocessing a plurality of times at different size ratios to the size of the test image g1 and the area of interest Ax1 and the adjacent areas Ax2. Changing the compression ratio is an example of changing the size ratio to the size of the test image g1 and the area of interest Ax1 and the adjacent areas Ax2.

In addition, the processes of steps S406 to S407 is an example of a process of generating the first feature image g21, the second feature image g22, and the third feature image g23 by the singular part extraction process based on a plurality of first preprocessed images g11 and a plurality of second preprocessed images g12.

This application example allows extraction of vertical streaks Ps11 or horizontal streaks Ps12 with different thicknesses or noise points Ps13 with different sizes without omission.

Second Application Example

Figure 10:
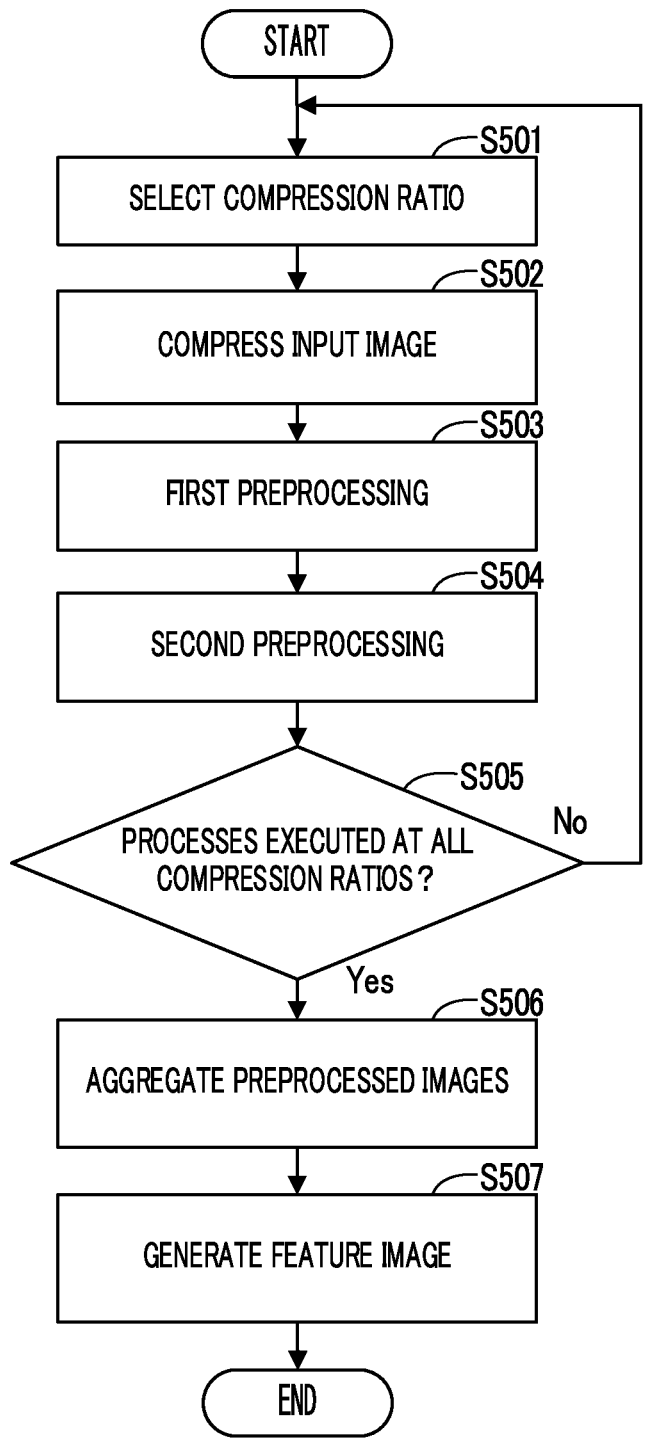
FIG. 10 is a flowchart showing an example of the procedure of a feature image generation process in a second application example of the image processing apparatus according to the embodiment.

Next, the procedure of the feature image generation process in a second application example of the image processing apparatus 10 will be described with reference to the flowchart shown in FIG. 10.

In the following description, S501, S502, . . . represent identification codes of a plurality of steps in the feature image generation process according to the present application example. The feature image generating process according to the present application example starts from step S501.

<Steps S501 to S505>

The feature image generation portion 8c executes the processes of steps S501 to S505, which are the same as those of steps S401 to S405. In step S505, the feature image generation portion 8c shifts the process to step S506 when the processes of steps S501 to S504 have been executed for all of the plurality of compression ratio candidates.

<Step S506>

In step S506, the feature image generation portion 8c aggregates each of a plurality of first preprocessed images g11 and a plurality of second preprocessed images into one image. Thereafter, the feature image generation portion 8c shifts the process to step S507.

For example, the feature image generation portion 8c sets a representative value such as a maximum value or an average value of respective pixel values in a plurality of first preprocessed images g11 as the corresponding pixel value of the aggregated first feature image g21. The same applies to a plurality of second preprocessed images g12.

<Step S506>

In step S506, the feature image generation portion 8c generates a first feature image g21, a second feature image g22, and a third feature image g23 by executing the singular part extraction process on the aggregated first preprocessed image g11 and second preprocessed image g12. Thereafter, the feature image generation portion 8c terminates the feature image generation process.

When the present application example is adopted, the same effect as that when the first application example is adopted can be obtained.

Third Application Example

Figure 11:
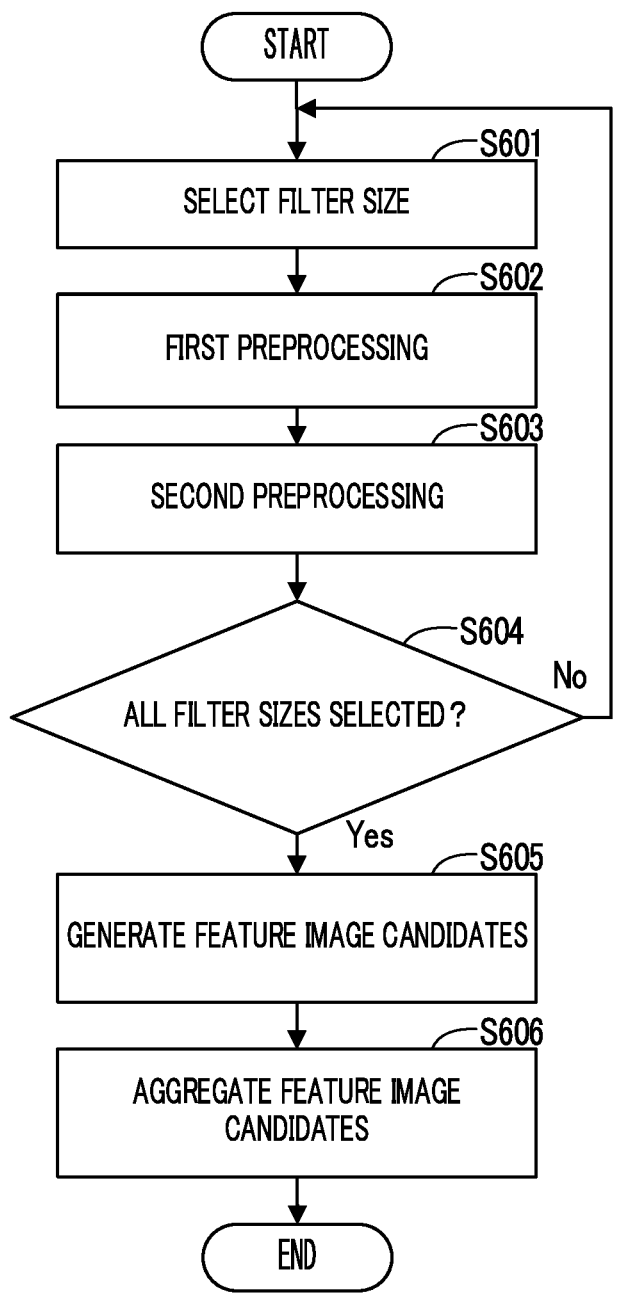
FIG. 11 is a flowchart showing an example of the procedure of a feature image generation process in a third application example of the image processing apparatus according to the embodiment.
Figure 12:
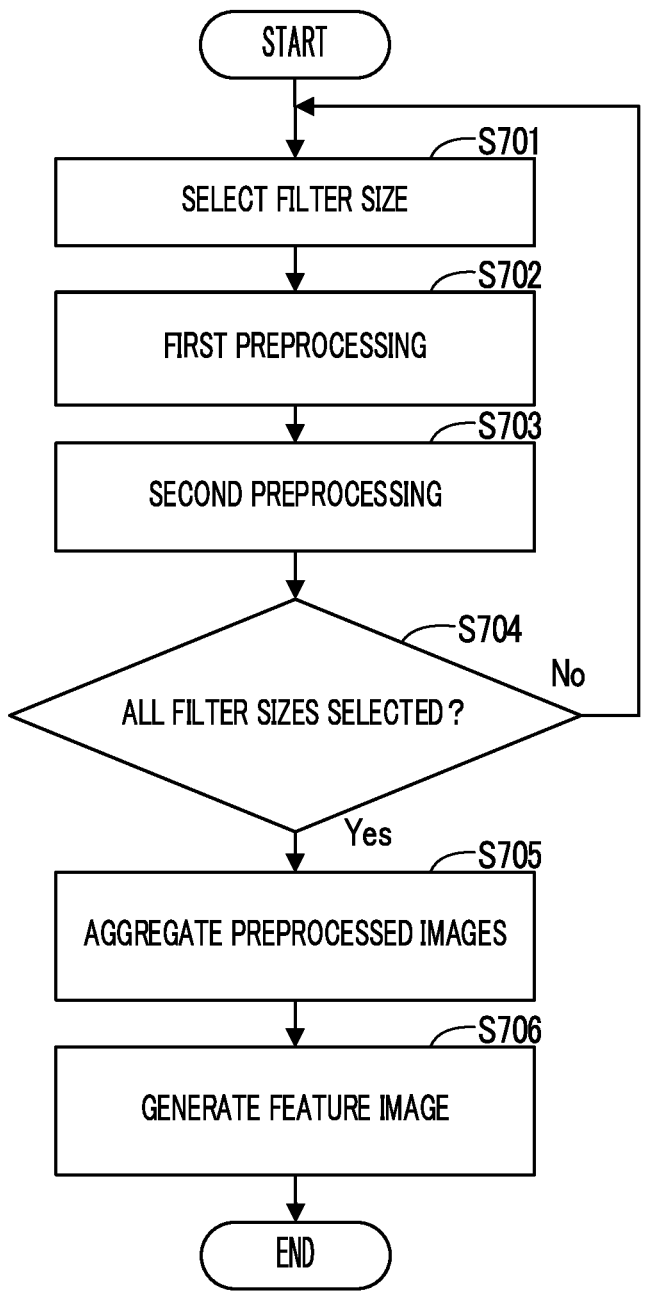
FIG. 12 is a flowchart showing an example of the procedure of a feature image generation process in a fourth application example of the image processing apparatus according to the embodiment.

Next, the procedure of the feature image generation process in a third application example of the image processing apparatus 10 will be described with reference to the flowchart shown in FIG. 11.

In the following description, S601, S602, . . . represent identification codes of a plurality of steps in the feature image generation process according to the present application example. The feature image generating process according to the present application example starts from step S601.

In the following description, the size of the area of interest Ax1 and the adjacent areas Ax2 in the first preprocessing and the second preprocessing will be referred to as a filter size.

<Step S601>

In step S601, the feature image generation portion 8c selects the filter size to be adopted from a plurality of preset size candidates, and shifts the process to step S602.

<Step S602>

In step S602, the feature image generation portion 8c generates a first preprocessed image g11 by executing the first preprocessing with the filter size selected in step S601 on the test image g1. Thereafter, the feature image generation portion 8c shifts the process to step S603.

<Step S603>

In step S603, the feature image generation portion 8c generates a second preprocessed image g12 by executing the second preprocessing with the filter size selected in step S601 on the test image g1. Thereafter, the feature image generation portion 8c shifts the process to step S604.

<Step S604>

In step S604, the feature image generation portion 8c shifts the process to step S605 when the processes of steps S601 to S603 have been executed for all of the plurality of size candidates, and otherwise executes the processes of steps S601 to S603 with a different filter size.

In steps S601 to S604, the feature image generation portion 8c executes a plurality of times of the first preprocessing and a plurality of times of the second preprocessing with different sizes of the area of interest Ax1 and the adjacent areas Ax2 on one test image g1. Thus, the feature image generation portion 8c generates a plurality of first preprocessed images g11 and a plurality of second preprocessed images g12.

<Steps S605 and S606>

Figure 9:
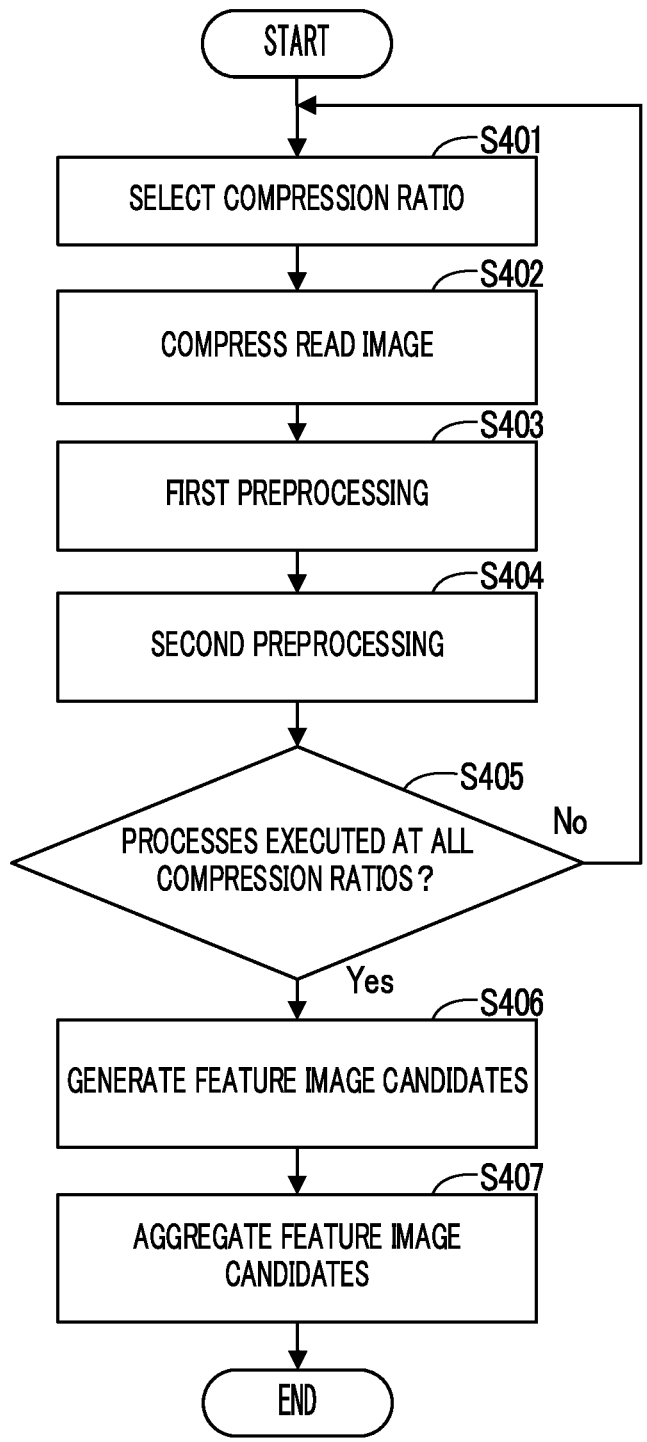
FIG. 9 is a flowchart showing an example of the procedure of a feature image generation process in a first application example of the image processing apparatus according to the embodiment.

In steps S605 and S606, the feature image generation portion 8c executes the same processes as those of steps S406 and S407 in FIG. 9. Thereafter, the feature image generation portion 8c terminates the feature image generation process.

By the processes of steps S605 and S606, a plurality of candidates of each of the first feature image g21, the second feature image g22, and the third feature image g23 are aggregated, and the aggregated first feature image g21, the second feature image g22, and the third feature image g23 are generated.

The processes of steps S601 to S604 are an example of a process of generating a plurality of first preprocessed images g11 and a plurality of second preprocessed images g12 by executing the first preprocessing and the second preprocessing a plurality of times at different size ratios to the size of the test image g1 and the area of interest Ax1 and the adjacent areas Ax2. Changing the filter size is an example of changing the size ratio to the size of the test image g1 and the area of interest Ax1 and the adjacent areas Ax2.

This application example allows extraction of vertical streaks Ps11 or horizontal streaks Ps12 with different thicknesses or noise points Ps13 with different sizes without omission.

Fourth Application Example

Next, the procedure of the feature image generation process in a fourth application example of the image processing apparatus 10 will be described with reference to the flowchart shown in FIG. 11.

In the following description, S701, S702, . . . represent identification codes of a plurality of steps in the feature image generation process according to the present application example. The feature image generating process according to the present application example starts from step S701.

<Steps S701 to S704>

The feature image generation portion 8c executes the processes of steps S701 to S704, which are the same as those of steps S601 to S604. In step S704, the feature image generation portion 8c shifts the process to step S705 when the processes of steps S701 to S703 have been executed for all of the plurality of size candidates.

<Steps S705 and S706>

Further, the feature image generation portion 8c executes the processes of steps S705 and S706, which are the same processes as those of steps S506 and S507. Thereafter, the feature image generation portion 8c terminates the feature image generation process.

When the present application example is adopted, the same effect as that when the first application example is adopted can be obtained.

Fifth Application Example

Next, the feature image generating process in the fifth application example of the image processing apparatus 10 will be described.

In the present application example, the feature image generation portion 8c compares each pixel value of the first preprocessed image g11 and the second preprocessed image g12 with a predetermined reference range to discriminate the pixels that constitute the singular part Ps1 from the pixels that do not.

That is, in the present application example, the feature image generation portion 8c identifies the singular part Ps1 by the magnitude of each pixel value of the first preprocessed image g11 and the second preprocessed image g12 in the singular part extraction process.

Further, the feature image generation portion 8c extracts the vertical streak Ps11 by excluding the singular part Ps1 common to the first preprocessed image g11 and the second preprocessed image g12 from the singular parts Ps1 of the first preprocessed image g11.

Further, the feature image generation portion 8c extracts the horizontal streak Ps12 by excluding the singular part Ps1 common to the first preprocessed image g11 and the second preprocessed image g12 from the singular parts Ps1 of the second preprocessed image g12.

Further, the feature image generation portion 8c extracts the singular part Ps1 common to the first preprocessed image g11 and the second preprocessed image g12 as the noise point Ps13.

For example, the feature image generation portion 8c generates a first feature image g21 by converting a first pixel value Xi determined to be a part other than the vertical streak Ps11 in the first preprocessed image g11 into an interpolated value based on the surrounding pixel values.

Similarly, the feature image generation portion 8c generates a second feature image g22 by converting a second pixel value Yi determined to be a part other than the horizontal streak Ps12 in the second preprocessed image g12 into an interpolated value based on the surrounding pixel values.

Similarly, the feature image generation portion 8c generates a third feature image g23 by converting a first pixel value Xi determined to be a part other than the noise point Ps13 in the first preprocessed image g11 into an interpolated value based on the surrounding pixel values.

Alternatively, the feature image generation portion 8c may generate the third feature image g23 by converting the second pixel value Yi determined to be a part other than the noise point Ps13 in the second preprocessed image g12 into an interpolated value based on the surrounding pixel values.

The invention claimed is:

1. An image processing method in which a processor determines a cause of an image defect based on a test image read from an output sheet of an image forming device, the method comprising:

generating, by the processor, a plurality of feature images by executing a predetermined feature extraction process on the test image; and executing, by the processor, a feature pattern recognition process of using each of the plurality of feature images as an input image and determining which of a plurality of predetermined cause candidates corresponding to the image defect the input image corresponds to by pattern recognition of the input image, wherein the plurality of feature images include a first feature image, a second feature image, and a third feature image, and the feature extraction process includes:

generating a first preprocessed image by executing, with a horizontal direction of the test image used as a processing direction, first preprocessing including a main filter process of converting a pixel value of each pixel of interest sequentially selected from the test image into a converted value obtained by a process of emphasizing a difference between pixel values of an area of interest including the pixel of interest and pixel values of two preset adjacent areas adjacent to the area of interest on both sides in the processing direction;

generating a second preprocessed image by executing second preprocessing including the main filter process with a vertical direction of the test image used as the processing direction; and generating the first feature image into which a first singular part that is present in the first preprocessed image and is not common to the first preprocessed image and the second preprocessed image among singular parts each consisting of one or more significant pixels in the first preprocessed image and the second preprocessed image has been extracted, the second feature image into which a second singular part that is present in the second preprocessed image and is not common to the first preprocessed image and the second preprocessed image among the singular parts has been extracted, and the third feature image into which a third singular part that is common to the first preprocessed image and the second preprocessed image among the singular parts has been extracted.

2. The image processing method according to claim 1, further comprising:

executing, by the processor, a periodic singular part determination process of determining presence or absence of one or more predetermined periodicities in a predetermined sub-scanning direction for one or more of the plurality of feature images and determining the cause of the image defect in accordance with a periodicity determination result, wherein the feature pattern recognition process is executed for a feature image of the plurality of feature images that was not subjected to the periodic singular part determination process and a feature image of the plurality of feature images that was determined to have no periodicity by the periodic singular part determination process.

3. The image processing method according to claim 1, wherein the first preprocessing includes:

generating first main map data by executing the main filter process with the horizontal direction used as the processing direction;

generating horizontal edge intensity map data by executing an edge enhancement filter process on the test image targeting the area of interest and one of the two adjacent areas with the horizontal direction used as the processing direction; and generating the first preprocessed image by correcting each pixel value of the first main map data with a corresponding pixel value of the horizontal edge intensity map data, and the second preprocessing includes:

generating second main map data by executing the main filter process with the vertical direction used as the processing direction;

generating vertical edge intensity map data by executing the edge enhancement filter process on the test image targeting the area of interest and one of the two adjacent areas with the vertical direction used as the processing direction; and generating the second preprocessed image by correcting each pixel value of the second main map data with a corresponding pixel value of the vertical edge intensity map data.

4. The image processing method according to claim 1, further comprising:

executing, by the processor, a periodic unevenness determination process of determining presence or absence of one or more predetermined periodicities in a sub-scanning direction for each predetermined color for the test image and determining presence or absence of occurrence of periodic density unevenness, which is a type of the image defect, in accordance with a periodicity determination result.

5. The image processing method according to claim 4, further comprising:

determining the presence or absence of occurrence of random density unevenness, which is a type of the image defect, by determining for each predetermined color whether or not a pixel value variation exceeds a predetermined allowable range for the test image determined to have no periodicity by the periodic unevenness determination process.

6. The image processing method according to claim 5, further comprising:

executing, by the processor, a random pattern recognition process of using the test image determined to have the random density unevenness as the input image and determining which one or more of the cause candidates the input image corresponds to by pattern recognition of the input image.

7. The image processing method according to claim 1, wherein the feature pattern recognition process is a process of classifying the input image into one of the plurality of cause candidates using a trained model trained in advance using a plurality of sample images corresponding to the plurality of cause candidates as training data.

8. The image processing method according to claim 1, further comprising:

transmitting, by the processor, a message corresponding to the determination result in the feature pattern recognition process to a predetermined terminal through a communication device.

9. An image processing apparatus comprising a processor for executing the processes of the image processing method according to claim 1.

* * * * *